(12) United States Patent
von Mueller et al.

(10) Patent No.: US 9,361,617 B2
(45) Date of Patent: Jun. 7, 2016

(54) VARIABLE-LENGTH CIPHER SYSTEM AND METHOD

(75) Inventors: Clay von Mueller, San Diego, CA (US); Mihir Bellare, San Diego, CA (US)

(73) Assignee: VeriFone, Inc., San Jose, CA (US)

( * ) Notice: Subject to any disclaimer, the term of this patent is extended or adjusted under 35 U.S.C. 154(b) by 1960 days.

(21) Appl. No.: 12/481,504

(22) Filed: Jun. 9, 2009

(65) Prior Publication Data

US 2009/0310778 A1   Dec. 17, 2009

Related U.S. Application Data

(60) Provisional application No. 61/159,333, filed on Mar. 11, 2009, provisional application No. 61/073,328, filed on Jun. 17, 2008.

(51) Int. Cl.
*H04L 9/28* (2006.01)
*G06Q 20/38* (2012.01)
(Continued)

(52) U.S. Cl.
CPC .......... *G06Q 20/3823* (2013.01); *G07F 7/1008* (2013.01); *G07F 7/1016* (2013.01); *H04L 9/0625* (2013.01); *H04L 2209/12* (2013.01); *H04L 2209/56* (2013.01)

(58) Field of Classification Search
CPC ... H04L 9/0618; H04L 9/0625; H04L 9/0631; H04L 9/0637; H04L 9/0643; H04L 9/065; H04L 9/0656; H04L 9/0662; H04L 9/0668; H04L 9/0675; H04L 9/08
USPC .................................................... 380/28, 44
See application file for complete search history.

(56) References Cited

U.S. PATENT DOCUMENTS 3,953,887 A    4/1976   Kobylarz et al.
3,962,726 A    6/1976   DeLand et al.
(Continued)

FOREIGN PATENT DOCUMENTS

EP    0644474    3/1995
EP    1363226    5/2002
(Continued)

OTHER PUBLICATIONS

M. Liskov, R. Rivest, and D. Wagner. Tweakable block ciphers. Advances in Cryptology—Crypto 2002, LNCS vol. 2442, Springer, pp. 31-46, 2002.*

(Continued)

*Primary Examiner* — Krista Zele
*Assistant Examiner* — Tariq Najee-Ullah
(74) *Attorney, Agent, or Firm* — Sheppard Mullin Richter & Hampton LLP

(57) ABSTRACT

Systems and methods for enciphering data are provided. In one embodiment, information is enciphered using a variable block length cipher that returns the encrypted symbol set in the same format as the plaintext symbol set. The cipher can be based on DES, AES or other block ciphers. In one example implementation a method for enciphering token information the invention provides for enciphering token information by constructing a tweak of a defined length using token information; converting the tweak to a bit string of a defined size to form a first parameter; converting a number of digits of plaintext to a byte string of a defined size to form a second parameter, wherein the number of digits converted varies; defining a data encryption standard key; applying the data encryption standard key to the first and second parameters; computing a specified number of encryption rounds; and receiving enciphered token information.

23 Claims, 11 Drawing Sheets

(51) Int. Cl.
*G07F 7/10* (2006.01)
*H04L 9/06* (2006.01)
*H04L 9/00* (2006.01)

(56) References Cited

U.S. PATENT DOCUMENTS

| | | | |
|---|---|---|---|
| 4,028,734 A | 6/1977 | Mos | |
| 4,255,811 A * | 3/1981 | Adler | 380/37 |
| 4,297,735 A | 10/1981 | Eppich | |
| 4,316,055 A * | 2/1982 | Feistel | 380/37 |
| 4,319,131 A | 3/1982 | McGeary et al. | |
| 4,628,195 A | 12/1986 | Baus | |
| 4,650,978 A | 3/1987 | Hudson et al. | |
| 4,705,939 A | 11/1987 | Ulinski | |
| 4,837,426 A | 6/1989 | Pease | |
| 4,906,988 A | 3/1990 | Copella | |
| 4,944,619 A | 7/1990 | Suzuki et al. | |
| 4,949,192 A | 8/1990 | McGeary | |
| 5,010,240 A | 4/1991 | Sheldon | |
| 5,097,504 A | 3/1992 | Camion et al. | |
| 5,101,097 A | 3/1992 | Conant | |
| 5,126,990 A | 6/1992 | Efron et al. | |
| 5,214,409 A | 5/1993 | Beigel | |
| 5,233,169 A | 8/1993 | Longacre | |
| 5,235,166 A | 8/1993 | Fernadez | |
| 5,254,843 A | 10/1993 | Hynes et al. | |
| 5,257,320 A | 10/1993 | Etherington et al. | |
| 5,270,523 A | 12/1993 | Chang et al. | |
| 5,336,871 A | 8/1994 | Colgate | |
| 5,354,097 A | 10/1994 | Tel | |
| 5,358,088 A | 10/1994 | Kryder | |
| 5,365,586 A | 11/1994 | Indeck et al. | |
| 5,367,581 A | 11/1994 | Abel et al. | |
| 5,393,966 A | 2/1995 | Gatto et al. | |
| 5,396,369 A | 3/1995 | Deland et al. | |
| 5,408,505 A | 4/1995 | Indeck et al. | |
| 5,412,718 A | 5/1995 | Narasimhalu | |
| 5,428,683 A | 6/1995 | Indeck et al. | |
| 5,430,279 A | 7/1995 | Fernadez | |
| 5,459,629 A | 10/1995 | Wakasugi | |
| 5,461,525 A | 10/1995 | Christianson et al. | |
| 5,479,509 A | 12/1995 | Ugon | |
| 5,546,462 A | 8/1996 | Indeck et al. | |
| 5,552,947 A | 9/1996 | Nakanishi et al. | |
| 5,569,898 A | 10/1996 | Fisher et al. | |
| 5,570,339 A | 10/1996 | Nagano | |
| 5,572,507 A | 11/1996 | Ozaki et al. | |
| 5,587,654 A | 12/1996 | Indeck et al. | |
| 5,603,078 A | 2/1997 | Henderson et al. | |
| 5,616,904 A | 4/1997 | Fernadez | |
| 5,623,549 A * | 4/1997 | Ritter | 380/37 |
| 5,625,689 A | 4/1997 | Indeck et al. | |
| 5,644,636 A | 7/1997 | Fernandez | |
| 5,657,389 A | 8/1997 | Houvener | |
| 5,685,657 A | 11/1997 | Jablonski | |
| 5,691,526 A | 11/1997 | Evans | |
| 5,708,422 A | 1/1998 | Blonder et al. | |
| 5,724,428 A * | 3/1998 | Rivest | 380/37 |
| 5,740,244 A | 4/1998 | Indeck et al. | |
| 5,767,495 A | 6/1998 | DeLand | |
| 5,770,846 A | 6/1998 | Mos | |
| 5,780,828 A | 7/1998 | Mos et al. | |
| 5,814,796 A | 9/1998 | Benson et al. | |
| 5,829,743 A | 11/1998 | DeLand et al. | |
| 5,920,628 A | 7/1999 | Indeck et al. | |
| 5,930,794 A | 7/1999 | Linenbach et al. | |
| 5,949,884 A * | 9/1999 | Adams et al. | 380/29 |
| 5,959,794 A | 9/1999 | Indeck et al. | |
| 6,024,288 A | 2/2000 | Gottlich | |
| 6,038,321 A | 3/2000 | Torigai et al. | |
| 6,049,608 A * | 4/2000 | Ablowitz et al. | 380/28 |
| 6,053,406 A | 4/2000 | Litman | |
| 6,098,881 A | 8/2000 | DeLand et al. | |
| 6,105,011 A | 8/2000 | Morrison | |
| 6,111,956 A * | 8/2000 | Field et al. | 380/283 |
| 6,123,259 A | 9/2000 | Ogasawara | |
| 6,185,304 B1 * | 2/2001 | Coppersmith et al. | 380/37 |
| 6,185,679 B1 * | 2/2001 | Coppersmith et al. | 713/150 |
| 6,243,470 B1 * | 6/2001 | Coppersmith et al. | 380/259 |
| 6,260,146 B1 | 7/2001 | Mos et al. | |
| 6,266,647 B1 | 7/2001 | Fernandez | |
| 6,275,587 B1 * | 8/2001 | Amerige | 380/255 |
| 6,278,783 B1 * | 8/2001 | Kocher et al. | 380/277 |
| 6,308,886 B1 | 10/2001 | Benson et al. | |
| 6,335,799 B1 | 1/2002 | Provost | |
| 6,430,008 B1 | 8/2002 | Trabert et al. | |
| 6,431,445 B1 | 8/2002 | DeLand et al. | |
| 6,476,991 B1 | 11/2002 | Fernandez | |
| 6,480,356 B1 | 11/2002 | Mos | |
| 6,543,689 B2 | 4/2003 | Sabella | |
| 6,641,050 B2 | 11/2003 | Kelley et al. | |
| 6,644,547 B1 | 11/2003 | White | |
| 6,678,103 B2 | 1/2004 | Fernandez et al. | |
| 6,678,823 B1 | 1/2004 | Fernandez | |
| 6,760,841 B1 | 7/2004 | Fernandez | |
| 6,781,781 B2 | 8/2004 | Wood | |
| 6,830,182 B2 | 12/2004 | Izuyama | |
| 6,830,183 B2 | 12/2004 | Von Mueller et al. | |
| 6,837,435 B2 | 1/2005 | Kehoe et al. | |
| 6,885,748 B1 | 4/2005 | Wang | |
| 6,899,269 B1 | 5/2005 | Deland | |
| 6,901,375 B2 | 5/2005 | Fernandez | |
| 6,944,782 B2 | 9/2005 | Von Mueller et al. | |
| 6,963,980 B1 | 11/2005 | Mattsson | |
| 6,993,130 B1 | 1/2006 | Fernandez et al. | |
| 7,013,393 B1 | 3/2006 | Stevens | |
| 7,068,207 B2 | 6/2006 | Fujita et al. | |
| 7,068,787 B1 | 6/2006 | Ta et al. | |
| 7,103,575 B1 | 9/2006 | Linehan | |
| 7,113,930 B2 | 9/2006 | Eccles | |
| 7,120,933 B2 | 10/2006 | Mattsson | |
| 7,305,707 B2 | 12/2007 | Mattsson | |
| 7,313,822 B2 | 12/2007 | Ben-Itzhak | |
| 7,325,129 B1 | 1/2008 | Mattsson | |
| 7,418,098 B1 | 8/2008 | Mattsson | |
| 7,490,248 B1 | 2/2009 | Valfridsson | |
| 7,539,857 B2 | 5/2009 | Bartlett | |
| 7,548,622 B2 | 6/2009 | Carr | |
| 8,036,377 B1 * | 10/2011 | Poo et al. | 380/28 |
| 8,251,283 B1 * | 8/2012 | Norton | 235/380 |
| 8,769,279 B2 * | 7/2014 | von Mueller et al. | 713/168 |
| 2001/0047355 A1 | 11/2001 | Anwar | |
| 2002/0017559 A1 | 2/2002 | Mos et al. | |
| 2002/0017560 A1 | 2/2002 | Mos et al. | |
| 2002/0023215 A1 | 2/2002 | Wang et al. | |
| 2002/0046338 A1 | 4/2002 | Ueda et al. | |
| 2002/0145051 A1 | 10/2002 | Charrin | |
| 2002/0152180 A1 | 10/2002 | Turgeon | |
| 2002/0178145 A1 | 11/2002 | Ishida | |
| 2003/0028481 A1 | 2/2003 | Flitcroft et al. | |
| 2003/0061156 A1 | 3/2003 | Lim | |
| 2003/0061171 A1 | 3/2003 | Gilbert et al. | |
| 2003/0070074 A1 * | 4/2003 | Geller et al. | 713/168 |
| 2003/0085277 A1 | 5/2003 | DeLand et al. | |
| 2003/0089774 A1 | 5/2003 | Schmieder et al. | |
| 2003/0105725 A1 | 6/2003 | Hoffman | |
| 2003/0105967 A1 | 6/2003 | Nam | |
| 2003/0145205 A1 | 7/2003 | Sarcanin | |
| 2003/0146846 A1 | 8/2003 | Fujita et al. | |
| 2003/0192948 A1 | 10/2003 | Izuyama | |
| 2003/0200202 A1 * | 10/2003 | Hsiao et al. | 707/3 |
| 2003/0213840 A1 | 11/2003 | Livingston et al. | |
| 2004/0006699 A1 | 1/2004 | Von Mueller | |
| 2004/0049777 A1 | 3/2004 | Sullivan | |
| 2004/0128247 A1 * | 7/2004 | Sato et al. | 705/41 |
| 2004/0131182 A1 * | 7/2004 | Rogaway | 380/37 |
| 2004/0203930 A1 | 10/2004 | Farchmin et al. | |
| 2004/0238627 A1 | 12/2004 | Silverbrook et al. | |
| 2005/0036611 A1 | 2/2005 | Seaton | |
| 2005/0044044 A1 | 2/2005 | Burger et al. | |
| 2005/0137969 A1 * | 6/2005 | Shah | 705/39 |
| 2005/0167495 A1 | 8/2005 | Morley et al. | |
| 2005/0167496 A1 | 8/2005 | Morley et al. | |
| 2005/0173530 A1 | 8/2005 | DeLand et al. | |

(56) References Cited

U.S. PATENT DOCUMENTS

| | | | |
|---|---|---|---|
| 2005/0184165 | A1 | 8/2005 | Jong |
| 2005/0198318 | A1 | 9/2005 | Von Mueller |
| 2005/0218229 | A1 | 10/2005 | Morley et al. |
| 2005/0228688 | A1 | 10/2005 | Visser et al. |
| 2005/0247787 | A1 | 11/2005 | Von Mueller |
| 2006/0046842 | A1 | 3/2006 | Mattice et al. |
| 2006/0049255 | A1 | 3/2006 | Von Mueller |
| 2006/0049256 | A1 | 3/2006 | Von Mueller |
| 2006/0061503 | A1 | 3/2006 | Fujita et al. |
| 2006/0140401 | A1* | 6/2006 | Johnson et al. ............... 380/44 |
| 2006/0179296 | A1 | 8/2006 | Bartlett |
| 2006/0193471 | A1* | 8/2006 | Stehle ...................... 380/268 |
| 2006/0249574 | A1 | 11/2006 | Brown et al. |
| 2006/0285684 | A1* | 12/2006 | Rogaway ..................... 380/37 |
| 2007/0058806 | A1* | 3/2007 | Ferguson ..................... 380/42 |
| 2007/0067634 | A1 | 3/2007 | Siegler |
| 2007/0067637 | A1 | 3/2007 | Mattsson |
| 2007/0081668 | A1* | 4/2007 | McGrew et al. ............... 380/37 |
| 2007/0101425 | A1 | 5/2007 | Mattsson |
| 2007/0242829 | A1 | 10/2007 | Pedlow |
| 2008/0022136 | A1 | 1/2008 | Mattsson |
| 2008/0082834 | A1 | 4/2008 | Mattsson |
| 2008/0082837 | A1 | 4/2008 | Mattsson |
| 2008/0084995 | A1 | 4/2008 | Rodgers |
| 2008/0091944 | A1* | 4/2008 | von Mueller et al. ......... 713/168 |
| 2008/0098393 | A1 | 4/2008 | Chai et al. |
| 2008/0165973 | A1 | 7/2008 | Miranda Gavillan et al. |
| 2008/0170693 | A1 | 7/2008 | Spies et al. |
| 2009/0025057 | A1 | 1/2009 | Mattsson |
| 2009/0080647 | A1* | 3/2009 | Mantin ................. H04L 9/0637 380/29 |
| 2009/0089591 | A1 | 4/2009 | Mattsson |
| 2009/0214024 | A1* | 8/2009 | Schneider .................... 380/28 |
| 2010/0169657 | A1* | 7/2010 | Ghouti et al. ................ 713/181 |
| 2011/0103580 | A1* | 5/2011 | Hazay et al. .................. 380/28 |
| 2012/0039469 | A1* | 2/2012 | Mueller et al. ................ 380/252 |

FOREIGN PATENT DOCUMENTS

| | | |
|---|---|---|
| EP | 1460593 | 9/2004 |
| WO | 97/30533 | 8/1997 |
| WO | 02/43014 | 5/2002 |
| WO | 02/43015 | 5/2002 |
| WO | 01/65512 | 7/2002 |
| WO | 02/067157 | 8/2002 |
| WO | 2006/010947 | 2/2006 |
| WO | 2006/020320 | 2/2006 |
| WO | 2006/111022 | 10/2006 |
| WO | 2008/100396 | 8/2008 |

OTHER PUBLICATIONS

M. Liskov et al, Tweakable Block Ciphers, 2002, Springer-Verlag Berlin Heidelberg 2002, 31-46.*

S. Halevi, P. Rogaway, A Tweakable Enciphering Mode, 2003, International Association for Cryptologic Research, Crypto 2003, 482-499.*

J. Daemen, Cipher and Hash Function Design Strategies based on linear and differential cryptanalysis, 2004, University Thesis, 1-267.*

M. Bellare et al., Format-Preserving Encryption, 2009, SAC 2009, LNCS 5867, pp. 295-312.*

Cook et al, Elastic Block Ciphers: The Feistel Cipher Case, May 19, 2004, Columbia University, NY, Technical Report, pp. 1-15.*

NuGen I.T., "Response to CCIF Parts and Material Committee", Enterprise Workflow, NuGen I.T., The Internet Integration Company.

CCC Information Services, Inc., "How to Read an Estimate Quality Review," (2005), http://www.ccis.com.

M. Bellare, K. Pietrzak, and P. Rogaway. Improved Security Analyses for CBC MACs. Advances in Cryptology—Crypto '05, LNCs vol. 3621, pp. 527-545, Springer, 2005.

Bellare, M., Rogaway, P. The Security of Triple Encryption and a Framework for Code-Based Game-Playing Proofs. Advances in Cryptology—Eurocrypt '06, LNCs vol. 4004, pp. 409-426, Springer, 2006.

M. Bellare, A. Boldyreva, and A. O'Neill. Deterministic and efficiently searchable encryption. Advances in Cryptology—Crypto '07, LNCS vol. 4622, pp. 535-552, Springer, 2007.

M. Bellare, M. Fischlin, A. O'Neill, and T. Ristenpart. Deterministic encryption: Definitional equivalences and constructions without random oracles. Advances in Cryptology—Crypto '08, LNCS vol. 5157, pp. 360-378, Springer, 2008.

J. Black and P. Rogaway. CBC MACs for Arbitrary-Length Messages: The Three-Key Constructions. J. of Cryptology, vol. 18, No. 2, pp. 111-131, 2005.

J. Black and P. Rogaway. Ciphers with arbitrary finite domains. Topics in Cryptology—CT-RSA '02, LNCS vol. 2271, Springer, pp. 114-130, 2002.

J. Black, S. Halevi, H. Krawczyk, T. Krovetz, and P. Rogaway. UMAC: Fast and Secure Message Authentication. Advances in Cryptology—Crypto '99, LNCS vol. 1666. pp. 216-233, Springer, 1999.

J. Black and P. Rogaway. A Block-Cipher Mode of Operation for Parallelizable Message Authentication. Advances in Cryptology—Eurocrypt '02, LNCS vol. 2332, pp. 384-397, Springer, 2002.

A. Boldyreva, S. Fehr, and A. O'Neill. On notions of security for deterministic encryption, and efficient constructions without random oracles. Advances in Cryptology—Crypto '08, LNCS vol. 5157, pp. 335-359 Springer, 2008.

ISO/IEC 7812-1:2006. Identification cards—Identification of issuers—Part 1: Numbering system.

T. Iwata and K. Kurosawa. OMAC: One-Key CBC MAC. Fast Software Encryption—FSE '03, LNCS vol. 2887, pp. 129-153, Springer, 2003.

M. Luby and C. Rackoff. How to construct pseudorandom permutations from pseudorandom functions. SIAM Journal of Computing, vol. 17, No. 2, pp. 373-386, 1988.

S. Lucks. Faster Luby-Rackoff ciphers. Fast Software Encryption 1996, LNCS vol. 1039, Springer, pp. 189-203, 1996.

U. Maurer and K. Pietrzak. The Security of Many-Round Luby-Rackoff Pseudo-Random Permutations. Advances in Cryptology—Eurocrypt '03, LNCS vol. 2656, pp. 544-561, Springer, 2003.

M. Naor and O. Reingold. On the construction of pseudorandom permutations: Luby-Rackoff revisited. Journal of Cryptology, vol. 12, No. 1, pp. 29-66, 1999.

J. Patarin. New Results on Pseudorandom Permutation Generators Based on the DES Scheme. Advances in Cryptology—Crypto '91, LNCS vol. 576, Springer, pp. 301-312, 1991.

J. Patarin. Generic Attacks on Feistel Schemes. Advances in Cryptology—Asiacrypt '01, LNCS vol. 2248, Springer, pp. 222-238, 2001.

J. Patarin. Luby-Rackoff: 7 Rounds Are Enough for 2n(1-Q) Security. Advances in Cryptology—Crypto '03, LNCS vol. 2729, Springer, pp. 513-529, 2003.

J. Patarin. Security of Random Feistel Schemes with 5 or More Rounds. Advances in Cryptology—Crypto '04, LNCS vol. 3152, Springer, pp. 106-122, 2004.

S. Patel, Z. Ramzan, and G. Sundaram. Efficient constructions of variable-input-length block ciphers. Selected Areas in Cryptography 2004, LNCS vol. 3357, pp. 326-340, 2004.

PCI Security Standards Council. Payment Card Industry Data Security Standard Version 1.2. Available from https://www.pcisecuritystandards.org/security_standards/pci_dss.shtml.

B. Schneier and J. Kelsey. Unbalanced Feistel networks and block cipher design. Fast Software Encryption 1996, LNCS vol. 1039, Springer, pp. 121-144, 1996.

R. Schroeppel. Hasty pudding cipher specification. First AES Candidate Workshop, 1998.

T. Spies. Feistel Finite Set Encryption Mode. http://csrc.nist.gov/groups/ST/toolkit/15 BCM/documents/proposedmodes/ffsem/ffsem-spec.pdf.

Mattson, Ulf T., Format-Controlling Encryption Using Datatype-preserving Encryption.

Mattson, Ulf T., DB2 Security and PCI Compliance: A Best Practice Guide.

Satti, M.V. Kartik, A Quasigroup Based Cryptographic System.

Cisco Systems. Security: AP/Root Radio Data Encryption.

Crocker, David H., Standard for the Format of ARPA Internet Text Messages, RFC 822, Aug. 13, 1982.

* cited by examiner

Encryption  Algorithm $\mathcal{E}(T[0]...T[t-1], K_0 \| K_{in} \| K_{out}, P[0]...P[d-1])$
$d(0) \leftarrow d \text{ div } 2; d(1) \leftarrow d - d(0)$
$w_1 \leftarrow NtS_8(t) \| NtS_8(d) \| NtS_{48}(0)$
$w_2 \leftarrow NtS_{64}(DtN(T[0]...T[t-1]))$
$K_1 \leftarrow DES(K_0, DES(K_0, w_1) \oplus w_2) \uparrow 56$
$L_0 \leftarrow DtN(P[0]...P[d(0)-1])$
$R_0 \leftarrow DtN(P[d(0)]...P[d-1])$
FOR $i = 1,...,r$ do
  $L_i \leftarrow R_{i-1}$
  $s \leftarrow 1 - (i \bmod 2)$
  $x \leftarrow Nts_{48}(R_{i-1})$
  $R_i \leftarrow (F(i, x) + L_{i-1}) \bmod 10^{d(s)}$
$s \leftarrow r \bmod 2$
$C[0]...C[d(s)-1] \leftarrow NtD_{d(s)}(L_r)$
$C[d(s)]...C[d-1] \leftarrow NtD_{d(1-s)}(R_r)$
RETURN $C[0]...C[d-1]$

SUBROUTINE $F(i, x)$
$a \leftarrow NtS_8(i) \| NtS_8(d) \| x$
$y \leftarrow DES(K_1, a \oplus K_{in}) \oplus K_{out}$
$z \leftarrow StN_{64}(y)$
RETURN $z$ Decryption  Algorithm $\mathcal{D}(T[0]...T[t-1], K_0 \| K_{in} \| K_{out}, C[0]...C[d-1])$
$d(0) \leftarrow d \text{ div } 2; d(1) \leftarrow d - d(0)$
$w_1 \leftarrow NtS_8(t) \| NtS_8(d) \| NtS_{48}(0)$
$w_2 \leftarrow NtS_{64}(DtN(T[0]...T[t-1]))$
$K_1 \leftarrow DES(K_0, DES(K_0, w_1) \oplus w_2) \uparrow 56$
$s \leftarrow r \bmod 2$
$L_r \leftarrow DtN(C[0]...C[d(s)-1])$
$R_r \leftarrow DtN(C[d(s)]...C[d-1])$
FOR $i = r,...,1$ do
  $R_{i-1} \leftarrow L_i$
  $s \leftarrow 1 - (i \bmod 2)$
  $x \leftarrow NtS_{48}(R_{i-1})$
  $L_{i-1} \leftarrow (R_i - F(i, x)) \bmod 10^{d(s)}$
$P[0]...P[d(0)-1] \leftarrow NtD_{d(0)}(L_0)$
$P[d(0)]...P[d-1] \leftarrow NtD_{d(1)}(R_0)$
RETURN $P[0]...P[d-1]$

*Fig. 7*

Encryption Algorithm $\mathcal{E}(T[0]...T[t-1], K_0,...P[d-1])$
    $d(0) \leftarrow d$ div $2; d(1) \leftarrow d-d(0)$
    $w \leftarrow NtS_8(t) \parallel NtS_8(d) \parallel NtS_{112}(DtN(T[0]...T(t-1]))$
    $K_1 \leftarrow AES(K_0, w)$
    $L_0 \leftarrow DtN(P[0]...P[d(0)-1])$
    $R_0 \leftarrow DtN(P[d(0)]...P[d-1])$
    FOR $i = 1,...,r$ do
        $L_i \leftarrow R_{i-1}$
        $s \leftarrow 1-(i \bmod 2)$
        $x \leftarrow NtS_{112}(R_{i-1})$
        $R_i \leftarrow (F(i,x)+L_{i-1}) \bmod 10^{d(s)}$
    $s \leftarrow r \bmod 2$
    $C[0]...C[d(s)-1] \leftarrow NtD_{d(s)}(L_r)$
    $C[d(s)]...C[d-1] \leftarrow NtD_{d(1-s)}(R_r)$
    RETURN $C[0]...C[d-1]$

SUBROUTINE $F(i,x)$
$a \leftarrow NtS_8(i) \parallel NtS_8(d) \parallel x$
$y \leftarrow AES(K_1, a)$
$z \leftarrow StN_{128}(y)$
RETURN $z$ Decryption Algorithm $D(T[0]...T[\ -1], K_0, C[0]...C[d-1])$
    $d(0) \leftarrow d$ div $2; d(1) \leftarrow d-d(0)$
    $w \leftarrow NtS_8(t) \parallel NtS_8(d) \parallel NtS_{112}(0)...(DtN(T[0]...T[t-1])$
    $K_1 \leftarrow AES(K_0, w)$
    $s \leftarrow r \bmod 2$
    $L_r \leftarrow DtN(C[0]...C[d(s)-1])$
    $R_r \leftarrow DtN(C[d(s)]...C[d-1])$
    FOR $i = r,...,1$ do
        $R_{i-1} \leftarrow L_i$
        $s \leftarrow 1-(i \bmod 2)$
        $x \leftarrow NtS_{112}(R_{i-1})$
        $L_{i-1} \leftarrow (R_i - F(i,x)) \bmod 10^{d(s)}$
    $P[0]...P[d(0)-1] \leftarrow NtD_{d(0)}(L_o)$
    $P[d(0)]...P[d-1] \leftarrow NtD_{d(1)}(R_o)$
    RETURN $P[0]...P[d-1]$

*Fig. 8*

VARIABLE-LENGTH CIPHER SYSTEM AND METHOD

CROSS-REFERENCE TO RELATED APPLICATIONS

This application claims priority from U.S. Provisional Patent Application Ser. No. 61/159,333 filed Mar. 11, 2009 and U.S. Provisional Patent Application Ser. No. 61/073,328 filed Jun. 17, 2008.

TECHNICAL FIELD

The present invention relates to data security techniques. More particularly, some embodiments of the present invention relate to variable-length ciphers used for access authorization.

DESCRIPTION OF THE RELATED ART

Token systems have been in use in modern civilization in various implementations to provide and control many forms of access. Access that can be and often times is controlled by tokens can include physical access to rooms, buildings, areas and so on; electronic access to servers and data files; electronic account access; and so on. Another form of access controlled by tokens is the ability to conduct transactions such as, for example, credit, debit and other financial transactions. Credit cards, charge cards, debit cards, loyalty cards and other purchase-related tokens are used to provide the consumers with ready access to funds. Such transactions can enhance convenience of purchases, extend credit to customers, and so on.

As modern society has evolved, so have our tokens. Early tokens included physical objects such as coins, documents, and other physical objects. One example of a simple physical object token is the subway token made famous by the New York subway system. This simple token resembled a coin, could be purchased at kiosks, and was used to control access to the subway system. Another example of simple physical token for granting access was the early railway token developed in the 19th century for the British railway system. This token was a physical object, such as a coin, that a locomotive engineer was required to have before entering a particular section of the railway. When the train reached the end of the section, the driver left the token at a drop point so it could be to be used by the next train going the other way. Because there was only one token for a given section of railway, the token system helped to ensure that only one train would be on that section of the track at a given time.

The railway token system minimized the likelihood of head on collisions, but this simple token also limited the ability for trains to follow one another along a given section. As such, the system evolved into a token and ticket system. In this system, if a train reached a checkpoint and the token was present, the driver was given a ticket to pass, leaving the token in place in case another train approached that section traveling in the same direction. Safeguards were implemented to ensure that tickets were correctly issued. As technology evolved, the physical token and ticket system evolved to include electronic signaling to control access to sections of the railway.

Another example of tokens to grant access is charge cards, credit cards and debit cards. Some attribute the 'invention' of credit cards to Edward Bellamy, who described them in his 19th century novel *Looking Backward*. Early cards were reportedly used in the early 20th century United States by fuel companies and by Western Union. By mid century, Diners Club produced a charge card for merchant purchases, which was followed shortly thereafter by American Express. These cards, now ubiquitous in our society, allow customers to make purchases and conduct transactions with relative ease. Early cards were embossed with a customer account number, which was manually transferred to a receipt via a carbon transfer process. Modern cards, or tokens, have evolved to use electronic mechanisms of storing data including, for example, magnetic stripes, RFID tags, and smart card and chip card technologies.

Other examples of tokens include government issued IDs such as driver's licenses and passports. Such tokens can also be used to control access in various forms. For example, a passport can be used to control access to countries and regions. Passports can also be used to access employment and licensing opportunities as a document to prove the holder's citizenship. A driver's license is another form of token, allowing access to driving privileges, and to establishments requiring proof of identity, residency or age. Still other examples of tokens can include bank drafts, stock certificates, currency and other token items relating to finance. Still further token examples can include tokens for physical access and security such as keys, card keys, RF or LC cards, RFID tokens, toll road transponders, and the like.

As these examples illustrate, the use of tokens for various forms of access has gained popularity in various business and industries and has evolved to embrace newly developed technologies. Tokens are not limited to these examples, but can take on various forms and use various instrumentalities and control, govern or arbitrate various forms of access in a variety of different ways. Tokens can be static tokens, where the token data does not change, or dynamic tokens, where the data changes over time or with each token use. An example of a static token is a magnetic stripe bankcard whose data remains the same with each swipe. An example of a dynamic token is a garage door opener employing rolling codes, wherein the code changes with each use. Dynamic tokens are generally thought to be more secure than static tokens because with dynamic tokens, although data might copy from a given use, that data is not valid for subsequent uses. Likewise, there can be two types of token-based access systems— static access systems and dynamic access systems. Say One downside of token access, however, is the opportunity to defraud the system. For example, stolen or counterfeited tokens are often used to gain unauthorized access. In fact, the Federal Trade Commission reports that credit and charge card fraud costs cardholders and issuers hundreds of millions of dollars each year. As the importance of token access has grown so has the ability of those seeking to defraud the system. These attackers often seek to gain access to valuable data through multiple means including operating system and application security weaknesses and often use sophisticated computer algorithms to attack token security. Such attacks may take the form of repetitive attempts to access the protected system, with each attempt providing additional information. The security of the data is improved when an attacker must make a tremendous number of encryption queries or invest an unreasonable amount of computation time to gain access to encrypted information.

However, simple static tokens such as bank cards for example, typically do not require sophisticated algorithms for attack. Because these tokens are static and the data does not change from used to use, the token can be compromised simply by copying the token data to another token. Indeed, bankcard data is often copied or skimmed by attackers who gain access to the cards and perform an authorized swipe a card reader that stores information or who attach their own counterfeit card reader to a legitimate card reader (such as at an ATM terminal) to skim the data from an unwitting user when he or she uses the ATM terminal.

Token systems are not the only data systems that are susceptible to attacks. Accordingly, a number of encryption, ciphering or other obfuscation techniques have been developed to secure blocks of data in a number of applications and environments. For example, the Data Encryption Standard (DES) is an encryption technique based on a symmetric-key algorithm that uses a 56-bit key to encrypt data. DES was adopted as an official Federal Information Processing Standard (FIPS) for the United States and has enjoyed widespread use internationally as well. In more recent applications, the Advanced Encryption Standard (AES) cipher has also been used.

All of these techniques require that the data be transmitted in one or more fixed size blocks. Each block is typically, for example, 64, 128, 256 or 512 bytes in length. If the data does not conform to the block size used by the cipher, the remaining portion of the block must still be sent for the data to be recovered. Accordingly, data strings are often padded to fill out the data block, resulting in inefficiencies. In addition these techniques also restrict the data to a defined symbol set. In the case of DES, each of the eight bytes contained within a sixty-four bit block contain all values from 0-255. Many existing transmission formats require that a byte value be limited to the digits zero through nine or the letters A-Z.

In operation, DES takes a input comprising a fixed-length string of cleartext bits and encodes it to form a ciphertext bitstring of the same length. Like many encryption techniques, DES uses a key to perform the encryption, adding a measure of security in that the key is typically required to decrypt the ciphertext string. The DES algorithm divides the data block into two halves and processes them using a Feistel routine, one half at a time.

The Advanced Encryption Standard, is also a block cipher that works on fixed-length blocks of data. Like DES, AES also takes an input block of a certain size, usually 128, and produces a corresponding output block of the same size, and uses a secret key to perform the encryption. Unlike DES, which is based on the Feistel scheme, AES is a substitution-permutation network, which is a series of mathematical operations that use substitutions and permutations.

BRIEF SUMMARY OF EMBODIMENTS OF THE INVENTION

According to one or more embodiments of the invention, various features and functionality can be provided to provide improved security for various forms of token transactions. Particularly, in accordance with one aspect of the invention, data security techniques such as, for example, various forms of variable-length ciphers, can be implemented for data transmission, including data transmission for use with token systems to provide an increased measure of security in the token data. In one embodiment, variable-length ciphers can be implemented while maintaining a fully deterministic system where any encrypted data decrypts to only the original data.

Accordingly, in some embodiments, a general cipher is used to capture encryption preserving arbitrary formats using a format-preserving Feistel such that the encryption can be format-preserving so that if the plaintext has some prescribed format, the encrypted ciphertext will have the same format. Consider a simple example of a cipher to map a name and address and credit card number in a predefined format. The cipher in this example can be configured to map an input (plaintext) of the form Name, Addr, CC to an output (ciphertext) of the form Name*, Addr*, CC*. Name*, like Name, must consist of two strings of letters each beginning with an upper case letter. Addr*, like Addr, must consist of alphanumeric characters, spaces, or commas followed by a valid postal code. CC*, like CC, must consist of 8-19 decimal digits followed by the output of the function L when applied to those digits. Furthermore, in this example, the ciphertext must be of the same length as the plaintext. For example, the ciphertext must occupy the same space as the plaintext and have the format necessary to be accepted by the software.

In some embodiments, a new primitive referred to as a general cipher is used. Unlike a conventional cipher, a general cipher has associated to it a family $\{Dom(\ell)\} \ell \in I$ of domains where I is some index set. For every key K, index $\ell$, and tweak T the cipher specifies a permutation $ET, \ell$ K on $Dom(\ell)$. Making the general ciphers tweakable can provide enhanced security. A construction (called format-preserving Feistel) of a general cipher is provided that is able to produce a cipher over an arbitrary given domain $\{Dom(\ell)\} \ell \in I$, which enables FORMAT-PRESERVING ENCRYPTION preserving arbitrary formats.

Consider the example of format-preserving encryption of credit card numbers. In this example, the goal is for the ciphertext CC*, like the plaintext CC, to be a sequence of digits whose last digit is the value of the function L applied to the other digits. Likewise, the length len(CC*) of CC* should be the same as the length len(CC) of CC. Assume the length ranges from 8 to 20 digits. Let $I=\{8, 9, \ldots, 20\}$ and let Dom($\ell$) be the set of all $\ell$-digit numbers whose last digit is the value of L applied to the other digits. Now a general cipher E over $\{Dom(\ell)\} \ell \in I$ can be used. Encrypt CC (under key K and tweak T) by letting $\ell = $len(CC) and letting the ciphertext be CC*=ET,$\ell$ K (CC), which has the desired format.

Moreover, this approach can be extended to cover more complex formats and a domain can be specified that captures the full example discussed above. The format-preserving Feistel in some embodiments is able to provide a general cipher over an arbitrary, given domain. The starting point can be the arbitrary domain cipher of Black and Rogaway, which combines a generalization of an unbalanced Feistel network with a technique called cycle walking. A format-preserving Feistel can be implemented to extend this to handle multiple domains with the same key and also to incorporate tweaks, and can be customizable. The round function is a parameter and can be based on a block cipher such as AES or DES, or on a cryptographic hash function such as SHA-256.

In various embodiments, some information about the plaintext (namely the format) is leaked by the ciphertext. One notion of security adapts the traditional PRP notion to general ciphers to capture no more than the format being leaked. Another uses a weaker message privacy (MP) and a still weaker notion of message recovery (MR) of security, because MP and MR are more efficient and may provide better security than PRP. (In the latter case a lot of security is often lost due to birthday attacks that don't threaten MP or MR.) This is particularly important in a context where domains may be small—for example, encrypting only 12 digits of a credit card number.

In an embodiment of the invention, a method is provided for enciphering data such as, for example, token information or other data. The method can be configured to use DES, AES or any other block cipher as the randomizing element of a modified Feistel network, and can also be implemented where the transmitted data is not limited to a fixed size block. Accordingly, the data can be of any length. For example, in some embodiments the string length ranges from one digit to 19 digits for VDES, and one to 66 digits for VAES. In accordance with one aspect of the invention, any secure randomizing function such as a deterministic random number generator could be used in place of the described block cipher randomizing function where the transmitted block size is related to the key length.

In an embodiment of the invention, the modified Feistel network is configured to use modulo addition or subtraction rather than XOR functions in each round of the encryption. Modulo addition and subtraction allow any symbol set to be encrypted while provided ciphertext in a block size that is equal to the plaintext block size. For example, ten decimal digits encrypt to 10 decimal digits while 10 alpha numeric characters encrypt to 10 alpha numeric characters. This can be advantageous, for example, in environments where encryption is added to legacy systems that are expecting the data to be delivered in predetermined block sizes. This is of particular value in the above-described example environment of encrypting bankcard token information in an existing transaction network, where the length of the encrypted data and the resultant symbol set must match the data to be transmitted using exiting infrastructures.

In an embodiment of the invention, a method for deterministically encrypting a plaintext symbol set having a variable block size, includes the steps of dividing the plaintext symbol set into first and second portions; applying a first encryption key to encrypt a data string and generate a second encryption key, wherein the data string includes a tweak; computing a determined number of encryption rounds using the second encryption key to create an enciphered symbol set, wherein the encryption rounds comprise successive encryption and modulo combination of alternating portions of the symbol set; and providing the enciphered symbol set in the same form as the plaintext symbol set. In some embodiments, computing a determined number of encryption rounds using the second encryption key can include in a first encryption round encrypting the first portion of the symbol set using the second key and combining the encrypted first portion with the second portion of the symbol set using a modulo operation; in a second encryption round, encrypting the second portion of the symbol set using the second key and combining the encrypted second portion with the output of the first round using a modulo operation; and in a subsequent encryption round, encrypting the output of the previous round set using the second key and combining the encrypted output of the previous round with the output of a round prior to the previous round using a modulo operation; and providing enciphered symbol set in the same form as the plaintext symbol set.

Applying the first key can include defining first and second parameters based on the tweak, and encrypting a combination of the first and second parameters using the first key to generate the second key. The encrypting can be done by encrypting a first parameter with the first key to obtain an encrypted first parameter, combining the encrypted first parameter with the second parameter and encrypting the combination of the encrypted first parameter and second parameter using the first encryption key.

The plaintext symbol set can include a variety of different types of information. One example includes token information. For example, the plaintext symbol set can comprise bankcard track data in a standard bankcard track data format, and wherein the enciphered symbol set is provided in the same format as the plaintext bankcard track data. Similarly, the plaintext symbol set can comprise bankcard track data comprised of symbols selected from the group consisting of decimal digits zero through nine, the modulo combination comprises modulo 10 addition or subtraction and the enciphered symbol set is comprised of symbols selected from the group consisting of decimal digits zero through nine. As another example, the modulo combination can comprise modulo 62 addition or subtraction to encipher a plaintext symbol set comprised of symbols selected from the group consisting of alphanumeric upper and lower case characters and decimal digits zero through nine and to output.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 4-1 and 4-2, is an operational flow diagram illustrating an example process using VDES encryption to encipher access or other information in accordance with one embodiment of the invention.

FIGS. 6-1 and 6-2, is an operational flow diagram illustrating an example process using VDES encryption to decipher previously enciphered access or other information in accordance with one embodiment of the invention.

FIG. 7 is a listing of the VDES encryption and decryption algorithms and subroutine according to one embodiment of the invention.

FIG. 8 is a listing of the VAES encryption and decryption algorithms and subroutine according to one embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Various embodiments described herein are directed toward a system and method for providing a system for increasing security of transactions in various forms. In one embodiment, system provides systems and methods are described for using variable-length ciphers across a communication medium.

Figure 1:
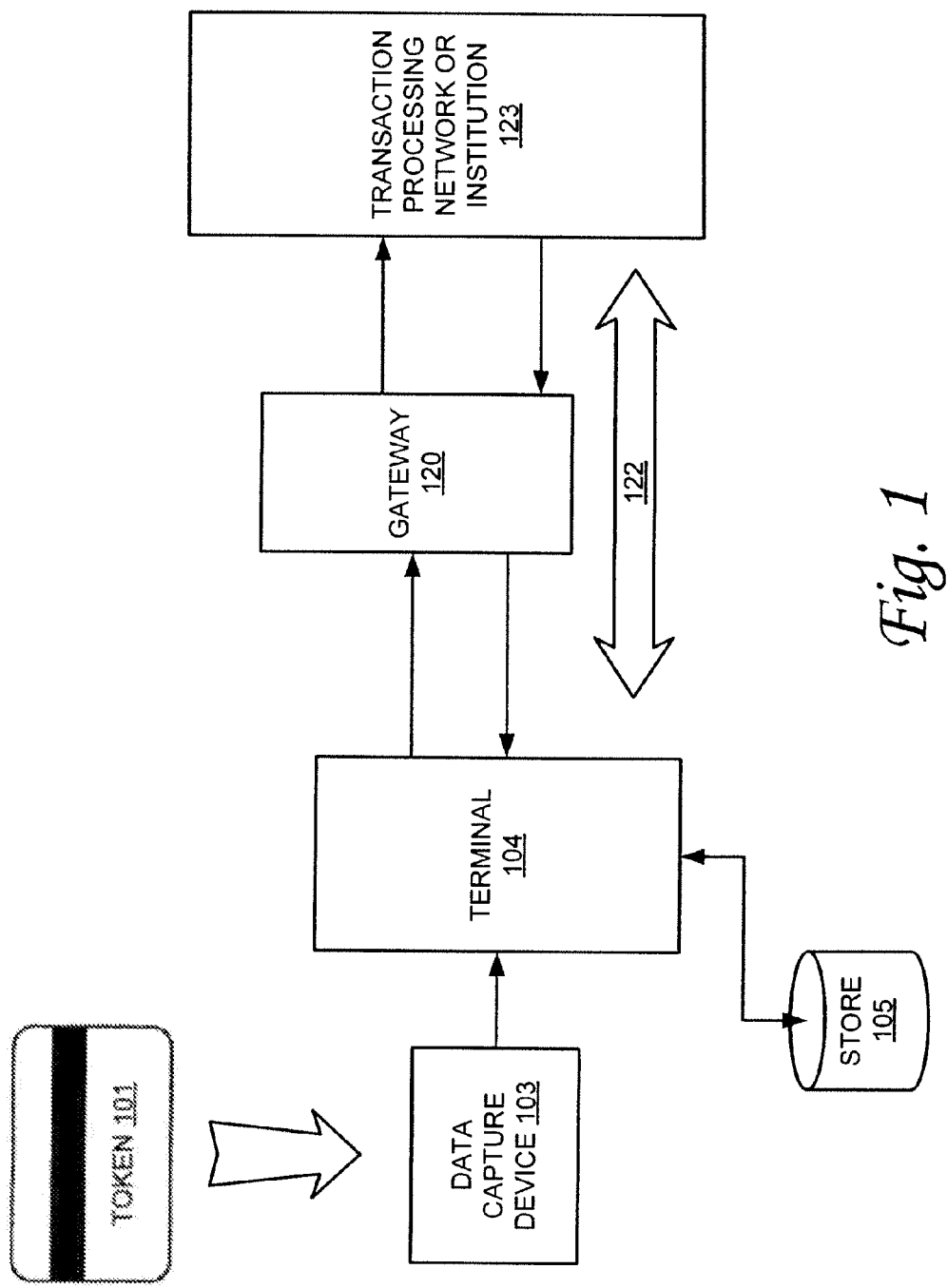
FIG. 1 is a diagram illustrating one example of a transaction network with which the present invention can be implemented.

Before describing the invention in detail, it is useful to describe an example environment with which the invention can be implemented. One such example is that of a transaction card network including a token used to facilitate purchases or other transactions. FIG. 1 is a diagram illustrating one example of a transaction network with which the present invention can be implemented. Referring now to FIG. 1, an example of transaction network is a token network that can be used to authorize and settle purchases of various goods and services. Illustrative examples of implementations of such a transaction network are the charge card, credit card and debit card transaction networks used to facilitate purchase transactions and banking transactions by and among merchants and other businesses, banks and other financial institutions and individuals. Generally speaking, in such a transaction network, the customer utilizes a charge card, credit card, debit card or other token as a symbol of his or her identity, or as an identification of the account he or she would like to have charged for the transaction. The token is typically accepted by the merchant, the account information read, and used to credit the transaction. Merchants may ask for a driver's license or other form of identification to verify the identity of the purchaser in conjunction with the token issued.

The token data is then sent to the appropriate financial institution or institutions, or other entities for processing. Processing can include, in one or more steps, authorization, approval and settlement of the account. As the example in FIG. 1 illustrates, a token 101 can be used by the customer to facilitate the transaction. As stated, in this example environment, examples of token 101 can include a charge card, debit card, credit card, loyalty card, or other token that can be used to identify such items as the customers, their account, and other relevant information. As a further example, a card such as a credit or debit card can include various forms of technology to store data, such as a magnetic stripe technology, processor or smart card technology, bar code technology or other technology used to encode account number or other identification or information onto the token. As such, a properly encoded token can include various forms of information relating to the purchaser such as, for example, the identity of the purchaser, information associated with the purchaser's account, the issuing bank or other financial institution, the expiration date, and so on.

As only one example of a token 101, a credit card can be used with a conventional magnetic stripe included on one side thereof. Conventional magnetic stripes can include three tracks of data. Further to this example, the ISO/IEC standard 7811, which is used by banks, specifies: that track one is 210 bits per inch (bpi), and holds 79 six-bit plus parity bit read-only characters; track two is 75 bpi, and holds 40 four-bit plus parity bit characters; and track three is 210 bpi, and holds 107 four-bit plus parity bit characters. Most conventional credit cards use tracks one and two for financial transactions. Track three is a read/write track (that includes an encrypted PIN, country code, currency units, amount authorized), but its usage is not standardized among banks.

In a conventional credit card token, the information on track one is contained in two formats. Format A, is reserved for proprietary use of the card issuer. Format B includes the following:
  Start sentinel—1 character
  Format code="B"—1 character (alpha only)
  Primary account number—up to 19 characters
  Separator—1 character
  Country code—3 characters
  Name—2-26 characters
  Separator—1 character
  Expiration date or separator—4 characters or 1 character
  Discretionary data—enough characters to fill up to the maximum record length (79 characters total)
  End sentinel—1 character
  Longitudinal Redundancy Check (LRC), a form of computed check character—1 character The format for track two can be implemented as follows:
  Start sentinel—1 character
  Primary account number—up to 19 characters
  Separator—1 character
  Country code—3 characters
  Expiration date or separator—4 characters or 1 character
  Discretionary data—enough characters to fill up to the maximum record length (40 characters total)
  LRC—1 character Although a credit card with magnetic stripe data is only one example of a token that can be used in this and other environments, this example environment is often described herein in terms of a credit card implementation for clarity and for ease of discussion.

Upon entering into a transaction, a merchant may ask the customer to present his or her form of payment, which in this example is the credit card. The customer presents the token 101 (e.g., credit card) to the merchant for use in the transaction terminal 104. In one embodiment, the credit card can be swiped by a magnetic stripe reader or otherwise placed to be read by the data capture device 103. In the current example where a credit card utilizing a magnetic stripe is the token 101, data capture device 103 can include any of a variety of forms of magnetic stripe readers to extract the data from the credit card. Other forms of data capture devices 103, or readers, may also be used to obtain the information from token 101. For example, bar code scanners, smart card readers, RFID readers, near-field devices, and other mechanisms can be used to obtain some or all of the data associated with token 101 and used for the transaction.

The data capture device is in communicative contact with a terminal 104, which can include any of a number of terminals including, for example, a point of sale terminal, point of access terminal, an authorization station, automated teller machine, computer terminal, personal computer, work stations, cell phone, PDA, handheld computing device and other data entry devices. Although in many applications the data capture device 103 is physically separated, but in communicative contact with, the terminal 104, in other environments these items can be in the same housing or in integrated housings. For example, terminals such as those available from companies such as Ingenico, Verifone, Apriva, Linkpoint, Hypercom and others.

Continuing with the credit card example, the customer or cashier can swipe the customer's credit card using the card-swipe device, which reads the card data and forwards it to the cashier's cash register or other terminal 104. In one embodiment, the magnetic stripe reader or other data capture device 103 is physically separated, but in communicative contact with, the terminal 104. In other environments these items can be in the same housing or in integrated housings. For example, in current implementations in retail centers, a magnetic stripe reader may be placed on a counter in proximity to a customer, and electronically coupled to the cash register terminal. The cash register terminal may also have a magnetic stripe reader for the sales clerk's use.

The customer may be asked to present a form of ID to verify his or her identity as imprinted on the token 101. For other transactions such as debit card transactions, the user may be required to key in a PIN or other authentication entry.

Continuing with the current credit card example, the terminal 104 can be configured to print out a receipt (or may display a signature page on a display screen) and the customer may be required to sign for his or her purchases, thus providing another level of authentication for the purchase. In some environments, terminal 104 can be configured to store a record of the transaction for recordkeeping and reporting purposes. Further, in some environments, a record of the transaction may be kept for later account settlement.

Typically, before the transaction is approved, terminal 104 seeks authorization from one or more entities in a transaction-processing network 123. For example, the merchant may seek approval from the acquiring bank, the issuing bank, a clearing house, or other entity that may be used to approve such transactions. Thus, depending on the token type, institutions involved and other factors, the transaction-processing network 123 can be a single entity or institution, or it can be a plurality of entities or institutions. As a further example, in one embodiment, transaction-processing network may include one or more processors or clearing houses to clear transactions on behalf of issuing banks and acquiring banks. The transaction-processing network also includes those issuing banks and acquiring banks. For example, one or more entities such as Global Payments, Visa, American Express, and so on, might be a part of transaction-processing network. Each of these entities may have one or more processing servers to handle transactions.

As illustrated in FIG. 1, a gateway 120 can be included to facilitate routing of transactions, authorizations and settlements to and from the appropriate entity or entities within the transaction-processing network 123. For example, where a merchant accepts credit cards from numerous different institutions, the gateway can use the BIN (Bank Identification Number) obtained from token 101 and passed to gateway 120 to route the transaction to the institution(s) associated with the given BIN. As illustrated by flow arrow 122, not all transactions are necessarily routed through a gateway 120. Transactions may take other paths to the appropriate entity or entities in the transaction-processing network 123. Additionally, the term gateway as used herein is not restricted to conventional gateway applications, but is broad enough to encompass any server or computing system configured to perform any or all of the described functionality. The term gateway is used for convenience only.

Although transaction-processing network 123 is illustrated using only one block in the example block diagram environment of FIG. 1, this block can represent a single entity to which the transaction is routed for authorization or settlement, or a network of entities that may be involved with authorization and settlement. Communications among the various components in the example environment can be wired or wireless transmissions using a variety of communication technologies formats and protocols as may be deemed appropriate for the given environment. As one example, the currently available credit card processing network and protocol structure can be utilized as the environment with which embodiments of the invention can be implemented. Various features and functions of the invention can be implemented within current or legacy transaction-processing networks to provide enhanced security.

Having thus described an example environment, the present invention is from time-to-time described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments, including environments where it is necessary or desirable to encrypt data for transmission or storage. Indeed, the invention is not limited to bank card environments and can be implemented for numerous different forms of data encryption.

Various systems and methods for utilizing variable-length ciphers for arbitrary format data are described. These are described in terms of examples of token access and for providing enhanced security measures for token access are herein described. Particularly, in terms of the example and related environments, embodiments provide security measures for financial transactions. One embodiment in this example application provides for variable length enciphering of some or all of the token data (credit card, charge card, debit card or other tokens) using a Variable Data Encryption Standard (VDES) algorithm. Another embodiment in this example application provides for variable length enciphering of some or all of the token data (credit card, charge card, debit card or other tokens) using a Variable Advanced Encryption Standard (VAES) algorithm. VAES may also be known as Rijndael encryption. Decryption can be performed at one or more appropriate points along the transaction path to reverse the enciphering using a predefined secret key. There are a number of conventional block cipher formats that have been developed and used in addition to DES and AES, including Blowfish, RC2, Skipjack, LOKI, RC5 and GOST. After reading the description contained herein, one of ordinary skill in the art will appreciate how the systems and methods described herein can be implemented with these and other alternative cipher algorithms.

Figure 2:
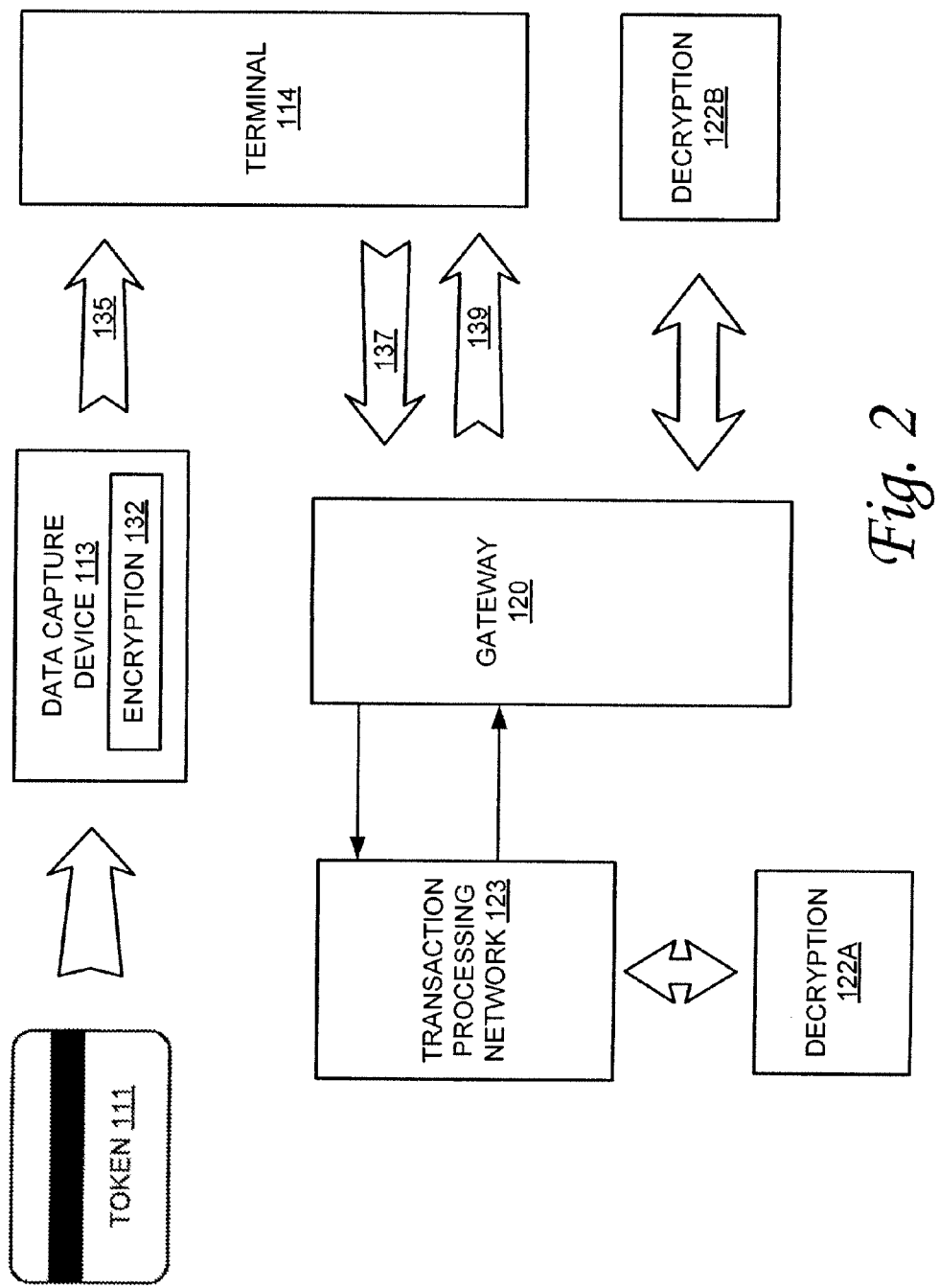
FIG. 2 is a diagram illustrating an implementation of features that can be associated with the invention in accordance with one embodiment of the invention.
Figure 3:
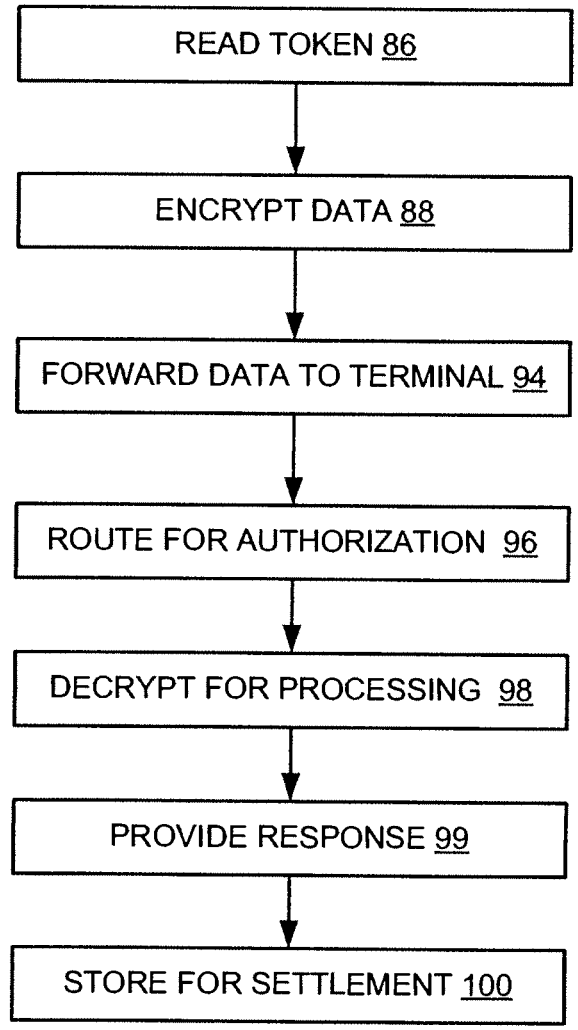
FIG. 3 is an operational flow diagram illustrating a process for enabling secure token transactions in accordance with one embodiment of the invention.

FIGS. 2 and 3 are diagrams illustrating an example implementation of features and functionality associated with embodiments of the invention operating within a network. FIGS. 2 is a diagram illustrating an implementation of features that can be associated with the invention in accordance with embodiments of the invention. Referring now to FIGS. 2 and 3, in a Step 86, data from a token 111 is read by a data capture device 113. A token can take any of the number of different forms previously mentioned, including the examples discussed above with reference to a token 101 in FIG. 1.

Additionally in embodiments of the invention, the data encoded in token 111 can be encrypted using the variable-length ciphers VDES or VAES. Although token data may be referred to as being "on" for "in" a token, or encoded "onto" or "into" a token, such as token 111, these terms are not meant to imply or require a particular physical structure for encoding the token with data.

Accordingly, in a Step 88, an encryption module 132, which can include one or more encryption algorithms, is used to encrypt some or all of the token data. Although the encryption in accordance with the invention can take place at a number of different points along the data stream, it is preferable for security purposes that the encryption take place as soon as possible or practical in the data read cycle. Therefore, in one embodiment of the invention, the encryption module is in the data path immediately following the data capture. For example, encryption can take place in the read head or elsewhere in the token-reader terminal. Preferably, then, the data can be encrypted as soon as it is read to enhance the security of the system.

In a step 94, the data captured by data capture device 113, and encrypted with encryption module 132, is forwarded to terminal 114 in furtherance of the transaction. In an application in accordance with the example environment, terminal 114 can include a cash register or other point of sale station or terminal, as an example. In other environments terminal 114 can be implemented as appropriate including, for example, checkpoint terminals, customs station terminals, point of access terminals, point of sale terminals, or other terminal appropriate for the given application.

In the application of a point of sale terminal, the terminal 114 can, in one embodiment, be a card-swipe terminal such as, for example, portable or countertop card-swipe terminals found as retail point-of-sale terminals. Other point of sale terminals might include, for example, gas pumps, ATM machines, vending machines, remote pay terminals, and so on. As another example, a terminal might include a token reader in communicative contact with a personal computer or other computing device for purchases such as, for example, internet purchases or for online banking. As a further example, in one embodiment, the terminal can include a magnetic stripe reader (including one or more read heads), a keypad (for example, for PIN entry, or other user entry), and a display. Thus, in this embodiment, the terminal 114 is integrated into the same package or housing as the data capture device 113. The terminal can also be integrated with or in communicative contact with a cash register or other point-of-sale or point-of-access station.

Illustrated in FIG. 2, is a secure data stream 135 in which some or all of the data has been encrypted by encryption module 132 before transmission to terminal 114. In a step 94, secure data stream 135 is forwarded to terminal 114 in furtherance of the transaction. As such, terminal 114 can use or forward some or all of the elements of data stream 135 as appropriate in conducting the transaction. Continuing with the example of a credit card sale, terminal 114, such as a point of sale terminal or a card-swipe terminal, can use this transaction data to obtain authorization for the transaction, obtain user input (for example, press "Yes" to approve the sale) as well as to print the receipts (or communicate with a cash register or other device to print receipts) or otherwise consummate the transaction.

In a step 96, terminal 114 routes the data to the transaction-processing network 123 to obtain authorization or approval for the transaction from one or more entities as appropriate. The data stream 137 routed by terminal 114 can include some or all of the data provided in the secure data stream 135, and can be augmented to provide additional data as may be appropriate for the environment or type of transaction.

Illustrated in the example provided in FIG. 2 is a gateway 120 that also can be used to route the data stream. As discussed above with reference to FIG. 1, a gateway 120 may or may not be involved in the transaction routing depending on the application or transaction and the network configuration and participants, and other parameters such as, for example, the complexity of the network and the routing options available. For example, where multiple terminals 114 can be used to carry out transactions for credit cards from a plurality of issuing authorities, a gateway functionality can be useful to route the transaction data among the terminals and the elements of the transaction-processing network.

As also discussed above with reference to FIG. 1, as used herein, the term "gateway" is broadly used to describe an entity, such as a server or other processing system, in the transaction stream that can be included to perform functions such as, for example, routing, interfacing, format or protocol conversion, storage, buffering and so on. For example, in one embodiment a gateway can be equipped for interfacing various terminals 114 with transaction-processing network 123 or with various entities in transaction-processing network 123. Further, in one embodiment, a gateway can be included to provide interfaces among various entities involved in the transaction. In terms of the example environment, a gateway may provide a common interface between a plurality of merchants and their terminals 114 on the one hand, and various banks, institutions or other entities on the other hand. Functionality that might be included in a gateway 120 can be, for example, protocol translation, data formatting, impedance matching, rate conversion, fault isolation, signal translation, buffering and storage, routing, or other functions as necessary or useful to provide interoperability or communications among transaction participants.

Gateways can be implemented using hardware, software, or a combination thereof. In one embodiment, gateway 120 is implemented as one or more processing devices configured to run software applications for the gateway functionality. In one or more embodiments discussed in this document, functions such as encryption, decryption, key storage and other related functions are at times discussed as being performed at or by a gateway. This description encompasses implementations where functions are performed using a separate module or appliance called by or otherwise accessed by the gateway. For example, in one or more embodiments, these functions are described as being performed by a secure transaction module that can be either a part of the gateway or accessed by the gateway. As will be apparent to one of ordinary skill in the art after reading this description, such discussion can indicate that the same devices that perform gateway functionality can also include hardware or software modules used to perform the encryption, decryption or other functions as well.

Alternatively, separate modules can be in communicative contact with the gateways and their functions called, accessed or used by the gateway to perform the encryption, decryption or other related functions. Indeed, in one embodiment, one or more separate appliances are provided to perform various decryption, encryption, key storage and updating and other functions, and the appropriate transaction data routed to the appropriate appliance for processing. Such appliances can themselves be implemented using hardware software or a combination thereof, and can be coupled in communicative contact with the gateway. As discussed herein, such appliances (sometimes also referred to as secure transaction modules) can be associated with entities other than the gateway, including issuing banks, acquiring banks, clearing houses, merchants and other entities that may be associated with, the transaction-processing network 123.

In a step 98, the encrypted information is decrypted for processing of the transaction. In the example illustrated in FIG. 2, the transaction data stream or other appropriate transaction data is routed to the transaction-processing network 123 entity or entities that will perform the authorization or other approval. In this example illustrated, the decryption occurs in this network or at this institution such that the clear text information can be recovered to facilitate transaction processing. The invention can be implemented so as to provide the decryption functions at any point in the transaction process as may be appropriate or desired for given security purposes. For example, once the transaction data reaches a secure processing network, it may be appropriate to decrypt the data within that network and handle the data as clear text because the network is secure. As another example, once the transaction reaches a clearing house, a secure transaction module can decrypt the information at or for the clearing house, and the transaction forwarded to the issuing bank for consummation. As yet another example, the transaction can remain encrypted until it reaches the issuing bank and can be decrypted at the issuing bank for processing. Where information is decrypted for handling or other processing (or for other purposes) prior to reaching its final destination, that information can be re-encrypted for subsequent transmissions.

As another example, connections between the gateway 120 and the transaction-processing network 123 may themselves be secure connections. In such situations, it may be desirable to decrypt some or all of the transaction data stream at gateway 120 prior to routing to the transaction-processing network 123. In furtherance of this example, consider a credit card transaction in which the entire account information is encrypted. It may be desirable in such a situation to have the gateway decrypt the account information to obtain the bank identification number to facilitate routing. With a secure connection, the decrypted information can be left in the clear for transfer to the transaction-processing network 123. In another embodiment, the gateway can be configured to re-encrypt some or all of the decrypted information prior to routing.

As another example, even where the routing data is clear, it may be desirable to have a secure transaction module available at the gateway to decrypt the transactions routed by that gateway. As such, a centralized (or somewhat centralized in the case of multiple gateways) decryption process can be implemented to handle decryption in one location (or in pre-determined locations) for multiple transactions for multiple merchants and multiple issuers. In such an application, centralized decryption can be implemented to provide centralized key management or centralized of other encryption algorithms or information. Likewise, information can be encrypted for storage in a database or other storage facility. Because different information fields that might be transmitted or stored can be of varying data lengths, it may be preferable to use a variable length cipher for such data.

Thus, to illustrate two of the possible decryption-placement scenarios, a decryption module is illustrated as decryption module 1 22A associated with transaction-processing network 123 and a decryption module 122B associated gateway 120. As these examples serve to illustrate, decryption of some or all of the information can be performed at one or more points along the network as may be appropriate for a given transaction. As also discussed in further detail below, various levels of encryption and decryption using one or more keys for portions of the data can be included to facilitate routing and handling of transactions in a secure manner.

In a step 99, an authorization response is provided from the transaction-processing network 123 indicating the status of the authorization. For example, where the transaction is approved, such authorization is transmitted to terminal 114 and can be stored at the terminal or in a storage device associated with the terminal for record-keeping purposes or further transactions. For example, considering again the application in a credit card transaction, when the initial transaction is carried out, terminal 114 typically seeks authorization from the transaction-processing network 123 and, once authorized, stores transaction information in a data file or other database for later settlement of the transaction. Thus, in this example, terminal 114 could store information associated with the authorized transaction for later settlement as illustrated by step 100.

In one embodiment, the encrypted information is stored as data in one of the tracks on the card. Typically, magnetic stripe cards, including most bank or credit cards have three tracks of data. For the access information, Tracks 1, 2 or 3 can be used. Note that in one environment, a conventional bank card may have traditional track 2 information encoded at 75 BPI. The tracks may not be perfectly timed and may include variations or jitter. In other words, the spacing between the transitions may vary from transition to transition and from card to card.

Additionally, because of these variations and the characteristics of the flux patterns on the magnetic strip, it is difficult to accurately recreate, or copy, magnetic stripe data from an original token to a new token and maintain the same characteristics. These transition characteristics create a level of uniqueness in the magnetic stripe data. Furthermore, because of these variations, the relationship of the tracks to one another may be affected. Therefore, it may be useful to encipher the jitter data using a variable length block encoding cipher for increased security as well as coping with the inherent variability of the magnetic stripe record.

VDES and VAES are tweakable, variable input length block ciphers that encipher decimal numbers such as those found in account numbers for credit cards, charge cards, debit cards, and the like. The primitive used for embodiments of the invention is a tweakable block cipher for enciphering numbers up to m-digits in length. The value of m depends on the algorithm.

Let Dom be the set of all strings over $Z10=\{0, \ldots, 9\}$ that have a length between 2 and m. The primitive is specified by an enciphering function $$\epsilon: \text{TwSp} \times \text{KeySp} \times \text{Dom} \rightarrow \text{Dom}$$

and associated deciphering function $$D: \text{TwSp} \times \text{KeySp} \times \text{Dom} \rightarrow \text{Dom}$$

The notation means that encryption utilizes in this example three inputs: a tweak T, which is selected from the set TwSp of possible tweaks; a key K, which is selected from the set KeySp of possible keys; and the plaintext data P, which in this case is a d-digit number, where $2 \le d \le m$. The output, denoted $\epsilon(T, K, P)$, is another d-digit number. In an embodiment of the invention, the tweak T is the bank identification number (BIN), the last four digits of the account number, plus the expiration date of the token. In VDES, the key K comprises a DES key and two auxiliary 64-bit keys. In another embodiment of the invention, the key K comprises a single 128-bit AES key.

The deciphering algorithm reverses the enciphering, therefore, $$D(T, K, \epsilon(T, K, P))=P$$

The variable-length ciphers in embodiments of the present invention are designed to guard against an attacker who has access to the merchant terminal. In attempting to decrypt a target enciphered card, the attacker can create and swipe tokens or cards of its choice through the token reading device. This is known as a chosen plaintext attack in cryptographic terms.

To begin the scenario described above, a target tweak T* and a target plaintext P* are selected. Next, a target key K is chosen at random from KeySp. Ciphertext C* is computed where $C^*=\epsilon(T^*, K, P^*)$. It is assumed that the attacker has: The target tweak T* and target ciphertext C*, and an enciphering oracle or device, Enc. The enciphering oracle may be viewed as a device that the attacker can call on for any inputs T, P of choice. The enciphering oracle returns $\epsilon(T, K, P)$. In this example the enciphering is done under the target key K, which the attacker does not have. To succeed, the adversary must output P*, the target plaintext.

The situation described above is comparable to that of an identity thief who has an enciphering of some of the digits of a user's account number, and also has the BIN, last four digits of the user's account and the expiration date of the account. The target plaintext P* is the digits of the user's account that are enciphered and which the thief does not have. The target ciphertext C* is the enciphered digits, where the enciphering is under the target tweak, and the target key K used is the key used in the merchant's terminal. The enciphering oracle models the possibility that an attacker can create and swipe, or read, cards of the attacker's choice. When the attacker does this, he effectively provides himself some tweak T and plaintext P and receives in return the enciphering $\epsilon$(T, K, P) under the target key K. Generally, more effective security is provided as the encryption method chosen requires the attacker to make a higher quantities of encryption queries, or invest an increasing amounts of computer running time.

The algorithms in accordance with embodiments of the invention are now described. First, some functions auxiliary to the algorithms are described and defined. These functions are used in the algorithms as set forth herein.

$NtS_l$ takes as input an integer N in the range $0 \leq N < 2^l$ and returns its encoding as a binary string of exactly l bits. For example, $NtS_6(3)=000011$.

$StN_l$ takes as input an l-bit string y and returns the integer $N(0 \leq N < 2^l)$ whose binary representation is y. For example, $StN_6(000011)=3$.

$NtD_l$ takes as an input an integer N in the range $0 \leq N < 10^l$ and returns its representation as an l-digit number. For example, $NtD_5(326)=00326$. This operation consists merely of prepending sufficient zeros to bring the number of digits to exactly l. In addition, this provides for the variable block length in the cipher.

DtN takes as input an i-digit number y and returns the corresponding integer N $(0 \leq N < 10^i)$ for example DtN(00326)=326. This operation includes removing sufficient leading zeros and is a further example of the variable block length of the cipher.

$|X|_{10}$ denotes the number of digits in a digit-represented number. For example, $|00326|_{10}=5$. The leading zeros are counted.

N div D returns the quotient obtained when integer N is divided by integer D. For example, 17 div 2=8 and 14 div 2=7.

N mod D returns the remainder obtained when integer N is divided by integer D. This is an integer in the range 0, . . . , D-1. This operation may be applied even when N is negative. For example (30−70) mod 100=60.

If $s_1, s_2, \ldots, s_n$ are strings then $s_1 \| s_2 \| \ldots \| s_n$ denotes the concatenation of those strings.

If x is a 64-bit string, the x↓56 denotes the first 56 bits of x.

Figures 1, 4:
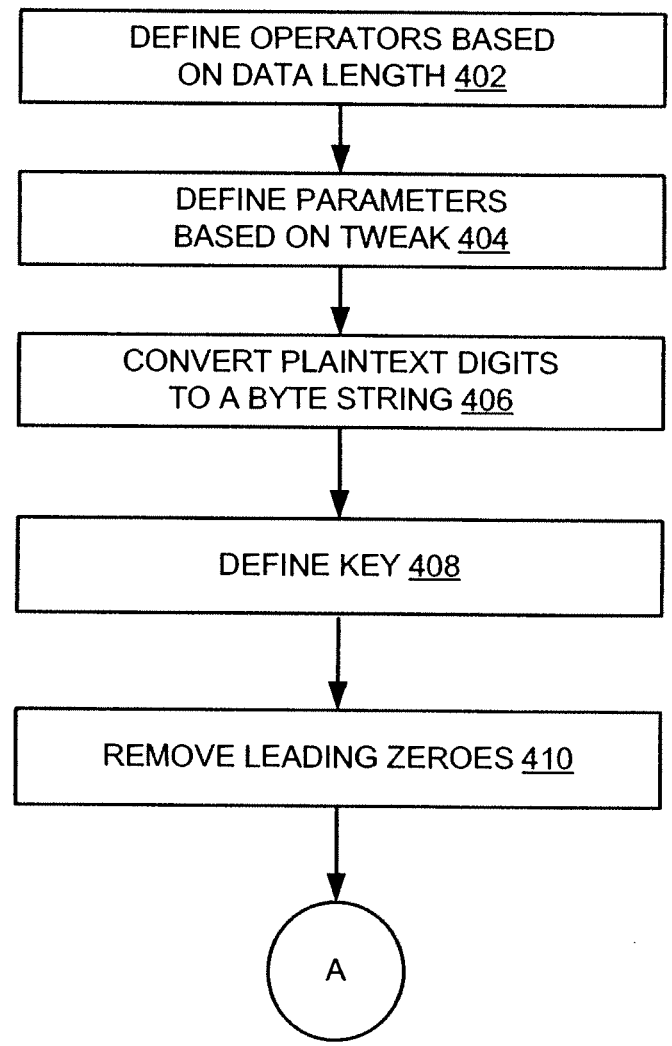
FIG. 4, which comprises
Figures 2, 4:
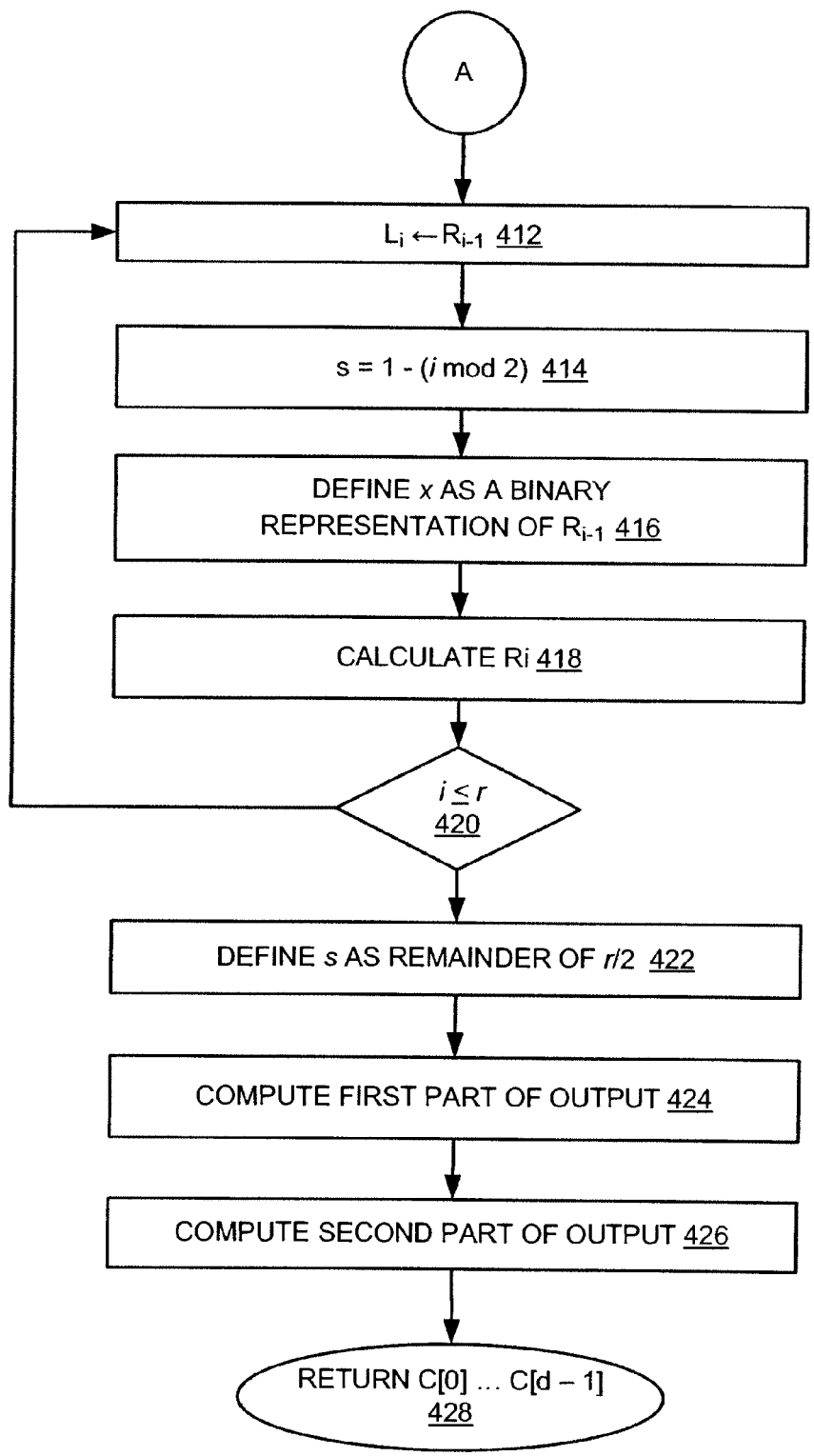

FIG. 4 shows an example variable-length encryption algorithm for enciphering and deciphering in accordance with one embodiment of the invention. This embodiment, which uses DES encryption, is now described in terms of example data parameters such as key length and tweak length. The key $K=K_0 \| K_{in} \| K_{out}$ in this example includes one 56-bit DES key and two auxiliary 64-bit keys, resulting in a total length of 184 bits in this embodiment.

The tweak T[0] . . . T[t−1] is a t-digit number. For a token access security application, such as described above, one example for the tweak can be defined to include the BIN, the last four digits of the account number and the expiration date of the card or token. In such a case t would be equal to fourteen—i.e., the tweak would be a 14-digit number. Although t can be chosen based on the needs of a given application, in various embodiments, the example algorithm is configured to handle a tweak of up to t=16. With the example algorithm, the tweak of length t is decided at the time the key is chosen. However, the algorithm can be extended to handle tweaks of variable length.

In various embodiments, the tweak can be an important aspect of the implementation. The actual tweak chosen can take a variety of forms and flexibility can used when choosing the tweak to implement. An example of the importance of the tweak can be illustrated in terms of a bank card environment where relatively short strings of symbols sets are encrypted. Indeed, for short PANs, the system might only be encrypting a few digits. In such uses, it would be trivial to build a dictionary with only a few digits worth of encrypted values. Accordingly, the tweak can be an important element of security in that it changes the encrypted values based on unencrypted values. Accordingly, this makes the size of the useful dictionary much larger thereby improving the security of the cipher.

The process, 400, begins with the step 402 of identifying operators based on the number of digits, d, in the plaintext. The plaintext P[0] . . . ,P[d−1] is a d-digit number where d can range in some embodiments from 2 to 28. The algorithm can be implemented to split it into two parts roughly equal in size. The first part has d(0) digits and the second part has d(1) digits. For example, if d=5, the d(0)=2 and d(1)=3. Thus, in one embodiment, these operators are defined as $$d(0)=d \text{ div } 2$$

$$d(1)=d-d(0).$$

Accordingly, d(0) is defined as the whole number quotient obtained when the number of digits, d, is divided by two, and d(1) is the number of digits, d, less d(0). Therefore, d(1) and d(0) together represent the entire data length, d.

In steps 404 and 406, the parameters $w_1$ and $w_2$ are defined based on the tweak, and represented as a bit string. In this example, the number of digits t in the tweak and the number of digits d in the data are each converted to a string. These strings are padded with zeroes to create bit strings $w_1$ and $w_2$ of desired length. In one embodiment, the tweak is a one-byte string and padded with 48 zeroes to create a bit string for $w_1$ that is 56 bits in length. Particularly, in one embodiment, the tweak is first modified to remove leading zeroes. This can be done, for example, using the DtN, operation described above, which takes as input an l-digit number (in this case the tweak) and returns the corresponding integer value with leading zeroes removed. Then, the modified tweak is further modified to create the binary string for the desired number of bits, which in this example is 56. This can be done, for example, using the $NtS_l$ operation described above (where l=56):

$$w_1 = NtS_{56}(DtN(T[0] \ldots T[t-1]))$$

In step 406 d digits of plaintext are converted to a fixed-length string, $w_2$. For example, in one embodiment, the plaintext digits are converted to a one-byte string. This can be done, fore example using:

$$w_2 = NtS_8(d)$$

where W2 is fixed length data that is eight bits long, and l=8.

In a step 408 a key is defined. For example, in one embodiment the encryption algorithm DES is applied to the 64-bit string $w_1 \| w_2$ with key, $K_0$, to produce a 64-bit string. The first 56 bits of the latter form the DES round key $K_1$.

$$K = DES(K_0 w_1 \| w_2) \downarrow 56$$

In step 410, the data set is operated on in two sections, $L_0$ and $R_0$, and the leading zeros are removed from the plaintext strings for each section of the dataset. In one embodiment, the dataset is divided in half. The division of the dataset can be such that $L_0$ is P[0] to P[d(0)−1], and $R_0$ is Pd(0) to P[d−1], for a plaintext data set of length d. Removing the leading zeroes can be accomplished with the DtN operation as $$L_0 \leftarrow DtN(P[0] \ldots P[d(0)-1])$$

$$R_0 \leftarrow DtN(P[d(0)] \ldots P[d-1])$$

In step 412 through 418, $L_i$ and $R_i$ are determined for a number of rounds r, where i=1, ..., r. The number r chosen is the number of rounds of processing for steps 412-418 described below. Security is typically increased with a greater number of rounds, r. An embodiment provides for an r of at least seven. In this case, with an r of seven, then a total of nine DES operations is required. In one embodiment, the maximum value of r is $2^8-1$, which comes from the fact that a round count of 1 byte ($2^8$) is included in the round function. Increasing the number of rounds is computationally expensive, so preferably the number of rounds is chosen so as to not exceed that required to achieve the desired level of security.

Referring now to steps 412-418, in a step 412, the current value of the left half L, $L_i$, is set to the previous value of the right half R, $R_i-1$.

$$L_i = R_{i-1}.$$

Step 414 returns the remainder of i/2, which in one embodiment is calculated as s, where $$s = 1 - (i \bmod 2).$$

In step 416, x is defined as a 48 bit binary representation of $R_i-1$. This can use the $NtS_j$ operation, where $$x = NtS_{48}(R_i-1).$$

Next, in step 418 $R_i$ is calculated as a function. In one embodiment, this is a function combined with $L_{i-1}$ where $$R_i = (F(i, d, x) + L_{i-1}) \bmod 10^{d(s)}.$$

Figure 5:
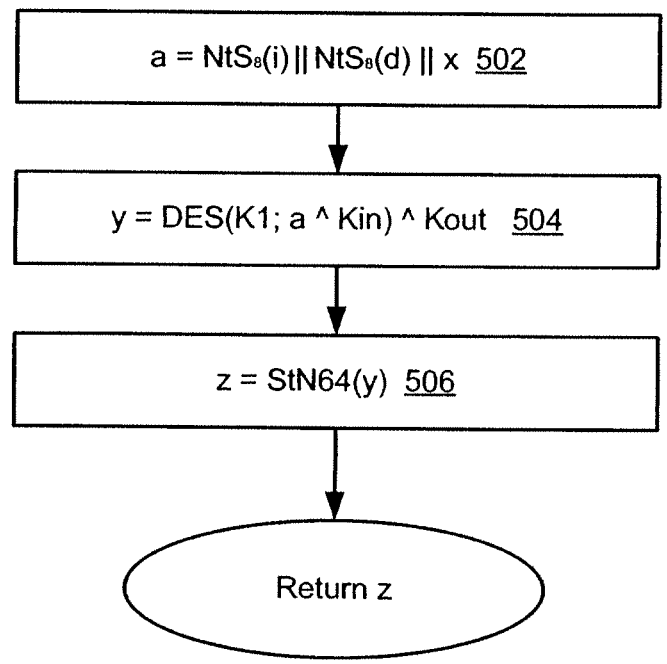
FIG. 5 is an operational flow diagram illustrating an example subroutine of VDES encryption in accordance with one embodiment of the invention.

The computation of the Feistel F(i, d, x) in one embodiment is described in FIG. 5. The term in the modulo function, mod $10^{d(s)}$ is a modulo base ten addition of the current F(i, d, x) value and the contents of Li−1. This differs from the use of the EXCLUSIVE-OR function used in conventional solutions. The benefit of modulo addition and subtraction is that the output from the operation is the in the same format as the input. For example, in the case of bankcard transactions, these would be base 10 numerical digits in the range of zero through ten. Other modulo bases can be used to realize the same input to output correspondence for other datasets. For example, upper case alpha (base 26), upper and lower case alpha (base 52) or alpha-numeric (base 62) can be accommodated with the corresponding mod XX operation.

As stated above, steps 412 through 418 are repeated for r iterations. Accordingly, the value of i is checked in step 420. If the value returned for i is less than or equal to r, then i is incremented, the process returns to step 412, and the next iteration of Ri is calculated. If, on the other hand r rounds have already been run, the process continues to step 422.

In step 422 a function s is defined as the remainder of r divided by two $$s = r \bmod 2.$$

At this point the first half of the output may be computed in step 424. In this step, $L_r$ is converted to a number of d(s) digits to form the first half of the output data according to the formula:

$$C_{out1} = C[0] \ldots C[d(s)-1] = NtD_{d(s)}(L_r)$$

Next the second part of the output is computed in step 426. In this step, Lr is converted to a number of d(s) digits to form the second half of the output data according to the formula:

$$C_{out2} = C[D(S)] \ldots C[d-1] = NtD_{d(1-s)}(R_r)$$

At this point, the process concludes, step 428 and returns the d-digit cipher text string $$C[0] \ldots C[d-1].$$

FIG. 5 describes the operations of an example DES subroutine that computes the DES rounds described briefly above in accordance with one embodiment of the invention. The process, 500 begins with step 502, which, in this example, concatenates the an 8-bit string of loopcount, i, with an 8-bits string of the data, d, and the 48-bit string of $R_{i-1}$. This example is illustrated by the function $$a = NtS_8(i) \| NtS_8(d) \| x.$$

The next step, 504 performs DES encryption operations to get y. in one embodiment, a and $K_{in}$, defined above, are encrypted using key K, and combined with $K_{out}$. These operations take a 64 bit input string, a, and return a binary value of y. These operations are XOR operation on the DES with keys to form y, defined below:

$$y \leftarrow DES(K_1, a \oplus K_{in}) \oplus Kout$$

Step 506 is defines the function z, which in one embodiment is the operation to return y, as a 64-bit integer value, z. The equation defining z is shown below:

$$z \leftarrow StN_{64}(y) \bmod 10^{d(s)}.$$

The process concludes when z is returned. This subroutine is repeated for each "round" of the DES function.

Several operational scenarios are now described to further highlight features and advantages of the embodiments described above. The inventions described herein and their multiple embodiments are not limited to applications as discussed in these scenarios. These scenarios are included to provide additional descriptive materials.

The variable DES algorithm offers numerous security advantages over a traditional DES algorithm. The VDES algorithm implements a Feistel network. The i-th round (1≤i≤r) splits the input into a left half of d(0) bits and a right half of d(1) bits if d is odd. It would be unusual for d to be odd, however. The variable nature of the VDES means that split sizes are not maintained across rounds as in traditional Feistel networks. Varying the split sizes does not appear to degrade security.

In order to accommodate enciphering digit sequences rather than bit sequences, the round function outputs digits. The traditional XORs have been replaced by modulo operations of appropriate powers of ten.

The round function is based on Data Encryption Standard Block Cipher-Key Whitening (known as DESX) and discussed in "How to Protect DES Against Exhaustive Key Search (an Analysis of DESX)" J. Kilian and P. Rogaway, J. Cryptology 14(1):17-35 (2001). The selection of DESX allows the same DES key to be used every round, instead of a different key every round, however, the effect of per round keys is induced by the inclusion of the round number in the DES output. This reduces key size and permits cost savings by reducing re-keying costs.

Tweakability is provided by specifying the round key $K_1$ as a pseudorandom function (PRF) of the tweak, the number t of digits in the tweak, and the number d, of digits in the input, under key $K_0$. ($K_0$ is part of the base key of the cipher). The role of the pseudorandom function is taken by the based DES based Cipher Block Chaining (CBC) MAC. In computing this CBC-MAC the number of iterations of DES is always exactly two, thereby providing security against splicing attacks. "Birthday" attacks may be possible, indicating that in approximately 232 calls to the encryption oracle, an attacker may find two different tweaks which result in the same round key $K_1$ and thus are equivalent from an encryption point of view. However, this does not appear to assist with plaintext recovery, which in the scenario of this application is the goal of the attacker. In addition, 232 is approximately four billion, and it is not clear that the number of tweaks in use is this high.

The round function converts bits to digits by interpreting the DESX output as an integer, and then takes the remainder upon division by the appropriate power of 10, as discussed above in the context of FIG. 5.

Figures 1, 6:
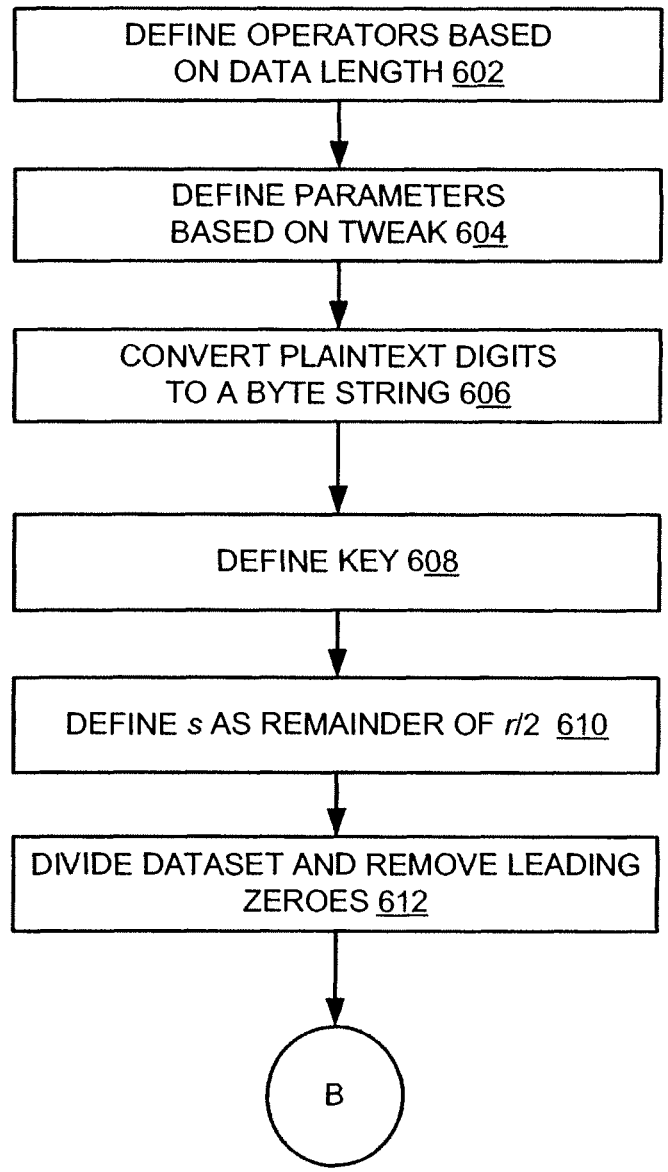
FIG. 6, which comprises
Figures 2, 6:
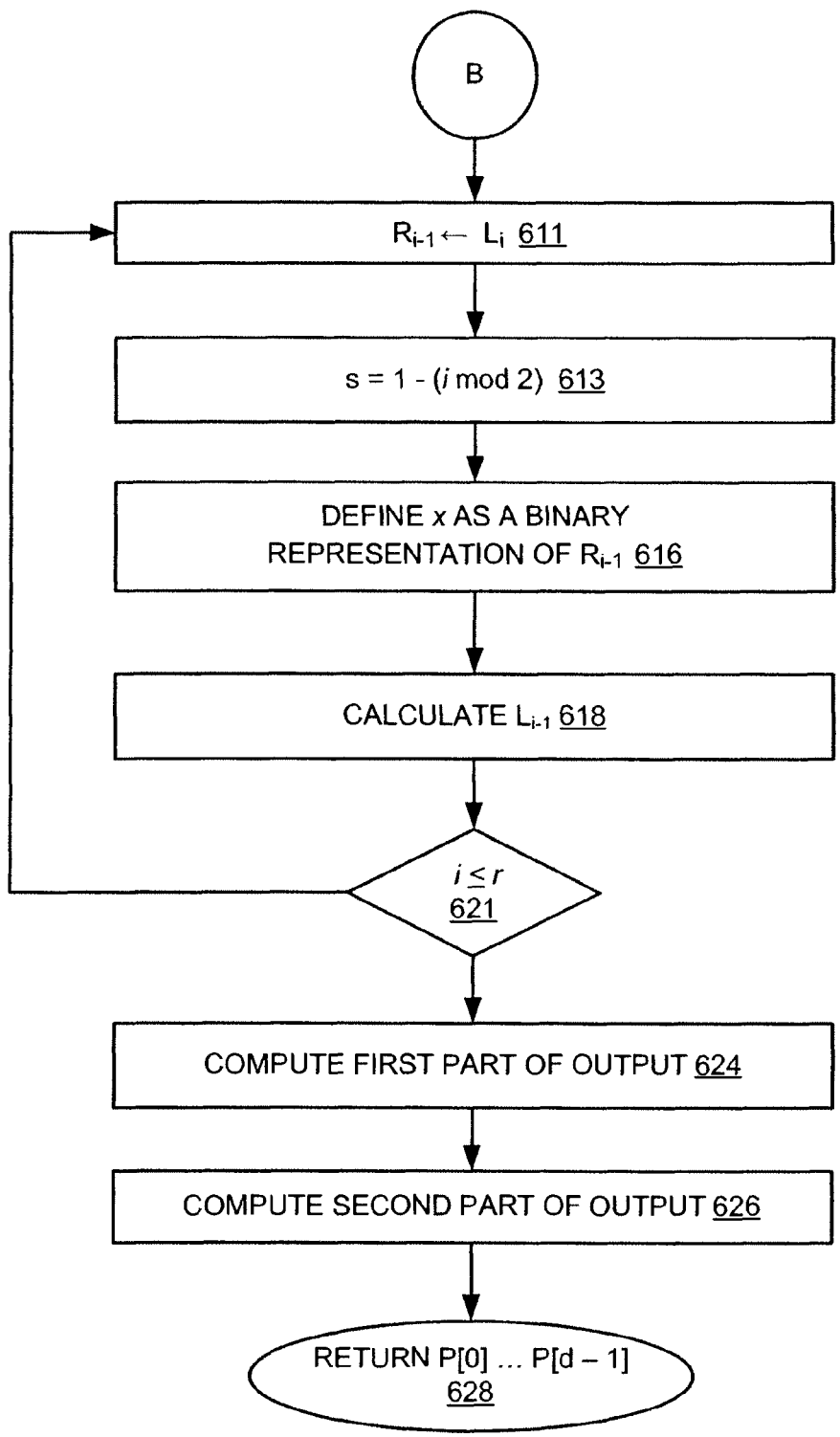

FIG. 6 provides a flowchart of the decryption process, 600. Essentially, the decryption process reverses the steps of the encryption. The definitions used in encryption also apply to decryption.

The process, 600, begins with the step 602 of identifying operators based on data length. These operators are defined as follows:

$$d(0)=d \text{ div } 2$$

$$d(1)=d-d(0).$$

Steps 604 and 606 define the parameters $w_1$ and $w_2$ based on the tweak, and represents them as a bit string. In this example, the number of digits t in the tweak and the number of digits d in the data are each converted to a string. These strings are padded with zeroes to create bit strings $w_1$ and $w_2$ of desired length. In one embodiment, the tweak is a one-byte string and padded with 48 zeroes to create a bit string for $w_1$ that is 56 bits in length. Particularly, in one embodiment, the tweak is first modified to remove leading zeroes. This can be done, for example, using the $DtN_l$ operation described above, which takes as input an l-digit number (in this case the tweak) and returns the corresponding integer value with leading zeroes removed. Then, the modified tweak is further modified to create the binary string for the desired number of bits, which in this example is 56. This can be done, for example, using the $NtS_l$ operation described above (where l=56):

$$w_1 = NtS_{56}(DtN(T[0] \ldots T[t-1]))$$

At 606, d digits of plaintext are converted to a fixed-length string, $w_2$. For example, in one embodiment, the plaintext digits are converted to a one-byte string. This can be done, fore example using:

$$w_2 = NtS_8(d)$$

where $w_2$ is fixed length data that is eight bits long, and l=8.

In step 608 a key is defined. For example, in one embodiment the encryption algorithm DES is applied to the 64-bit string $w_1 \| w_2$ with key, $K_0$, to produce a 64-bit string. The first 56 bits of the latter form the DES round key $K_1$.

$$K_1 = DES(K_0 w_1 \| w_2) \downarrow 56$$

In step 610, s is defined as the remainder of r divided by two $$s \leftarrow r \mod 2.$$

At step 612, the data set is operated on in two sections, $L_r$ and $R_r$, and the leading zeros are removed from the plaintext strings for each section of the dataset. In one embodiment, the dataset is divided in half. The division of the dataset can be such that $L_r$ is $C[0] \ldots C[d(s)-1]$, and $R_r$ is $C[d(s)] \ldots C[d-1]$, for a plaintext data set of length d. Removing the leading zeroes can be accomplished with the DtN operation as $$L_r \leftarrow DtN(C[0] \ldots C[d(s)-1])$$

$$R_r \leftarrow DtN(C[d(s)] \ldots C[d-1]).$$

In steps 611-618, $L_{i-1}$ and $R_{i-1}$ are determined for a number of rounds r, where i=1, ..., r.

In step 611, $R_{i-1}$ is defined as follows:

$$R_{i-1} \leftarrow L_i$$

Step 613 returns the remainder of i/2, which in one embodiment is calculated as s, where $$s=1-(i \mod 2).$$

In step 616, x is defined as a 48 bit binary representation of $R_i-1$. This can use the $NtS_l$ operation, where $$x = NtS_{48}(R_{i-1}).$$

Next, in step 618 $L_{i-1}$ is calculated as a function. In one embodiment, this is as shown below:

$$L_{i-1} \leftarrow (R_i - (F(i, d, x)(\mod 10^{d(s)})).$$

The Feistel function, F(i, d, x), can be computed the same as it is in the encryption process such as, for example, as described above. The term in the modulo function, mod 10d(s) is a 10 digit term and provides the variable length of the present embodiment of the invention to handle 10 integer digits. The mod operation may be adjusted to represent other forms of data such as, for example, the twenty-six letters of the alphabet in one case.

At this point in the operation the value of i is checked in step 621.

$$i \leq r$$

If the value returned for i is less than or equal to r, then the process increments i and returns to step 611 and recomputes $R_{i-1}$, and the subsequent steps in the round. If, on the other hand, the value returned at step 621 is that i is larger than r and 1 the process continues to step 624.

At this point the first half of the output may be computed in step 624. In this step, $L_r$ is converted to a number of d(s) digits to form the first half of the output data according to the formula:

$$P_{out1} = P[0] \ldots P[d(0)-1] \leftarrow NtD_{d(0)}(L_0)$$

Next the second part of the output is computed in step 626. In this step, Lr is converted to a number of d(s) digits to form the second half of the output data according to the formula:

$$P_{out2} = P[D(0)] \ldots P[d-1] = NtD_{d(1-0)}(R_0)$$

At this point, the process concludes at 628 and returns the value below:

$$P[0] \ldots P[d-1].$$

FIG. 7 provides another example encryption/decryption algorithm for VDES in accordance with one embodiment of the invention. In the embodiment illustrated in FIG. 7, the terms $w_1$, $w_2$, and $K_1$ are defined differently.

$$w_1 = NtS_8(t) \| NtS_8(d) \| NtS_{48}(0)$$

$$w_2 = NtS_{64}(DtN(T[0] \ldots T[t-1]))$$

$$K_1 = DES(K_0, DES(K_0, w_{1l} \oplus w_2) \downarrow 56$$

Also, in the example illustrated in FIG. 7, the subroutine for computing the function for calculating $R_i$ in the round, where z is calculated as $$z \leftarrow StN_{64}(y).$$

Likewise, similar changes to these factors are made in the decryption process to mirror the changes in the encryption algorithm. These are as also shown in FIG. 7.

A first type of attack against VDES to be considered is the exhaustive key search attack. This attack is impractical due to the 184 bit size of the cipher. A more important attack beyond the exhaustive key search attack is Patarin's attack. Patarin's attack is discussed in "Security of Random Feistel Schemes with Five or More Rounds" J. Patarin, Advances in Cryptology—CRYPTO '04, Lecture Notes in Computer Science Vol. 3152, M. Franklin ed., Springer-Verlag, 2004. Patarin's attack is ineffective against VDES because it is a distinguishing attack, not a message recovery attack. Recall that the goal of the attacker here is to recover the message, in this case, the account number. A Patarin attack can distinguish between an instance of the cipher and a random permutation, but does not lead to recovery of the target plaintext given the target ciphertext. In addition, a Patarin attack requires a prohibitive amount of computation time, even when the number being enciphered is only two digits long. The time would be significantly increased by the ten to sixteen or more digits used in a typical account number.

A further embodiment of the invention provides a variable advanced encryption standard (VAES) cipher that utilizes AES as part of the encryption and decryption algorithms instead of the DES cipher. FIG. 8 provides an example the encryption and decryption algorithm for VAES in accordance with one embodiment of the invention. The methodology for the VAES cipher in this example generally follows that set forth above for the VDES cipher with a few modifications. These modifications are now discussed in accordance with one embodiment of the invention.

Tweakability can be obtained by specifying the round key $K_1$ as a pseudorandom function of the tweak, the number t of digits in the tweak, and the number d of digits in the input, under key $K_0$. VAES directly applies AES as the pseudorandom function, since the block length is long enough to handle tweaks of sufficient length. "Birthday" attacks are precluded since no two tweaks result in the same common round key. While the key size of 128 bits is less than VDES, the key size is large to enough to preclude exhaustive key search attacks. Furthermore, Patarin's attack remains ineffective. All of these features provide enhanced security.

The key $K=K_0$ comprises a 128-bit AES key. The tweak, $T[0] \ldots T[t-1]$, is a t-digit number. The tweak in some embodiments is of any length in the range t=1 to t=33. The VAES algorithm in this embodiment does not use $w_1$ and $w_2$ as was the case with the example VDES described above. Instead a string w is formed, which in this example is a 128-bit string is formed by concatenating the following strings: a one byte representation of the number t of digits in the tweak; a once byte representation of the number d of digits in the plaintext; and a 112-bit representation of the tweak $T[0] \ldots T[t-1]$.

$$w \leftarrow NtS_8(t) \| NtS_8(d) \| NtS_{112}(DtN(T[0] \ldots T[t-1]))$$

The key in this example, $K_1$ is determined by an AES encrpytion of w using $K_0$ as the key. This produces a 128-bit AES round key $K_1$.

$$K_1 = AES(K_0, w)$$

As with VDES, the data set is operated on in two sections, $L_0$ and $R_0$, and the leading zeros are removed from the plaintext strings for each section of the dataset. In one embodiment, the dataset is divided in half. The division of the dataset can be such that $L_0$ is P[0] to P[d(0)-1], and $R_0$ is Pd(0) to P[d-1], for a plaintext data set of length d. Removing the leading zeroes can be accomplished with the DtN operation as $$L_0 \leftarrow DtN(P[0] \ldots P[d(0)-1])$$

$$R_0 \leftarrow DtN(P[d(0)] \ldots P[d-1]).$$

Also, as with VDES, $L_{i-1}$ and $R_{i-1}$ are determined for a number of rounds r, where i=1, ..., r. However, with this example VAES algorithm, x is set as a 112-bit string representation of $R_{i-1}$ as opposed to the 48-bit representation in the VDES example provided above. In an embodiment of the invention, the number of rounds is at least seven. The total cost of the algorithm is eight AES rounds. The maximum allowed value of r in some embodiments is 28−1.

The subroutine F(i, d, x) is also similar in this example, except that in this case, y is calculated as an AES encryption of a using key $K_1$, and z is returned as a 128-bit value.

$$y \leftarrow AES(K_0, w); z \leftarrow StN_{128}(y)$$

VAES is simpler and yet offers more security than VDES, although the algorithms are similar in design. VAES is capable of handling longer tweaks and plaintexts than VDES.

Essentially, the decryption process reverses the steps of the encryption. The decryption process for this example VAES algorithm begins with the step of identifying operators based on data length. These operators are defined as follows:

$$d(0) = d \text{ div } 2$$

$$d(1) = d - d(0).$$

Then, w is defined as set forth for the encryption process.

$$w \leftarrow NtS_8(t) \| NtS_8(d) \| NtS_{112}(DtN(T[0] \ldots T[t-1]))$$

The key in this example, $K_1$ is determined by an AES encrpytion of w using $K_0$ as the key. This produces a 128-bit AES round key $K_1$.

$$K_1 = AES(K_0, w)$$

A function s is defined as the remainder of r divided by two $$s \leftarrow r \bmod 2.$$

At this point the halves of the output may be computed. $L_r$ and Rr are defined as $$L_0 \leftarrow DtN(P[0] \ldots P[d(0)-1])$$

$$R_0 \leftarrow DtN(P[d(0)] \ldots P[d-1])$$

The following are several examples of format-preserving encryption using a general cipher. These illustrate how general ciphers can capture requirements and format-preservation constraints that cannot be captured in the framework of enciphering over a (single) finite set. The first example performs length-preserving encryption of (varying length) credit card numbers. The second example provides a general method for encrypting multi-alphabet strings. The third example shows how to use this multi-alphabet string cipher to perform format-preserving encryption of user records as per the example discussed above. The technique throughout utilizes the encode-then-encipher paradigm. For this section it is assumed that access to a general cipher GE=(E,KeySp,TwSp, I,Dom) with TwSp $\subseteq \{0, 1\}^*$ and with index set and domain sufficient for the examples.

EXAMPLE 1

Credit Card Numbers

In this example, the inputs are strings over $\_= \{0, 1, \ldots, 9\}$ where length $\ell$ can vary, say from 4 to 20. This is because one might want to encrypt varying amounts of the credit card numbers and discretionary data, leaving the rest in place. For example, the BIN or last four might be left in clear text, as might the cardholder's name. The output must be a string over $\_^*$ of the same length as the input. (Note this example ignores the functioning of the Luhn digit). Tweaks would be some of the (un-encrypted) credit card number digits encoded into bit strings in a natural way. This can be captured by setting by letting Domcc($\ell$)=_$\ell$ for all $\ell \in$ I={4, . . . , 20}. We seek a general cipher GEcc=(E,KeySp,TwSp,I,Domcc), and use the ability to have a domain with multiple sets in a crucial way to capture the length-preservation requirement. GEcc is constructed using encode-then-encipher with the enciphering via general cipher GE. Let s($\ell$)=10$\ell$ for $\ell$ I. Thus the indexes are just the number of digits in the credit card number. Next the encoding function Enc and decoding function Dec are described. Enc($\ell$,X), where X is a sequence of $\ell$ decimal digits, simply views X as the decimal representation of an integer N and returns N. Conversely for Dec. The final enciphering algorithm is E T,$\ell$ K(X)=Dec($\ell$, ET, $\ell$ K(Enc($\ell$,X)).

EXAMPLE 2

Multi-Alphabet Strings

This example constructs a general cipher for multi-alphabet strings. A multialphabet string is a sequence of digits pk . . . p1 where pi $\in$ _i for 1≤i≤k and alphabets _k, . . . 1. The index set for the cipher is any sequence of (uniquely encoded descriptions of) alphabets, e.g. _k_k−1 . . . 1 for any alphabets _k for any k>1. To any alphabet _, associate an injective map num_: _→[0 . . . |_|−1]. Its inverse is denoted via char_. Next a general cipher is constructed as GEmas= (~E,KeySp,TwSp,I,Dommas) that inherits the key space and tweak space of the underlying general cipher GE, has index set I specifying the space of arbitrary string formats (the sequence of alphabets digits are taken from), and Dommas that maps an index to a set Zs($\ell$). Next the encode-then-encipher paradigm is used with encoding and decoding functions as given as follows:

Enc($\ell$, P)
Parse $\ell$ as _k, . . . ,_1
Parse P as pk, . . . , p1 where pi $\in$ _i
x←num_1 (p1)+Pk
i=2 "num_i (p1)·Qj<i|_j|"
Return x
Dec($\ell$, y)
Parse $\ell$ as _k, . . . ,_1
For i=k to 2 do
d←Qj<i|j|; ci←⌊y/d⌋; y←y−ci·d
Return char_k (ck)k . . . kchar_2 (c2)kchar_1 (y)

Given an index I encoding alphabets _k, . . . ,_1, the routines map a k-digit multi-alphabet string (from said alphabets) to a numerical value between 0 and s($\ell$)−1 where s($\ell$)=Qk i=1|_i|. The domain map Dommas($\ell$) outputs Zs($\ell$). Notice that many values of $\ell$ will lead to the same Zn, but this will not be a problem either for security or functionality. The final enciphering algorithm is ~ET,$\ell$ K(X)=Dec($\ell$, ET, $\ell$ K(Enc($\ell$,X)).

EXAMPLE 3

Multi-Field Records

This example is provided in terms of the example above, where a name, address and credit card number are enciphered. The goal is to have a format-preserving encryption that maps input plaintext Name, Addr, CC to output ciphertext Name*, Addr*, CC*. Name and Name* must consist of two strings of letters, each being an upper case letter followed by lower case letters. Addr and Addr* must be alphanumeric characters, spaces, or commas followed by a valid postal code. CC and CC* must be 8-19 decimal digits followed by a valid Luhn digit. These formats can be handled by interpreting a record as a multi-alphabet string and using GEmas. All that is needed is how to derive an index for a given record. Let _lc={a, . . . , z}, _uc={A, . . . ,Z}, _let=_lc $\cup$_uc, _num={0, . . . ,9}, and _$\alpha$=_let $\cup$_num $\cup${,} $\cup${␣}. Let_zip be the set of all valid (5-digit US) postal (ZIP) codes. Let _i cc be the set of all i-digit credit card numbers with valid check digit. That is _i cc={nkL(n)|n$\in$ _i−1 num}. Write h_i to mean an (unambiguous) encoding of _into a string. Assume an encoding for which the concatenation of several such encodings can also be unambiguously decoded. The input is the triple of strings (Name, Addr, CC). Produce an index string $\ell$ as follows. Initially set $\ell$=$\epsilon$. Scan Name from left to right. For the first character, append h_uci to $\ell$. For each further non-space character in the first string, append h_leti. Append h{␣}i. Then append h_uci and append h_leti for each subsequent character. Then scan Addr, appending h_$\alpha$i for each character stopping before the final 5 digit postal code. Append here h_zipi. Finally, append h_cc ci where c is the number of decimal digits in CC. The result is a string encoding the appropriate alphabets of the characters used within the input record. (This example treats the ZIP code and credit card number as individual characters from particular alphabets.) Then encipher (for any desired tweak T) via ~ET,$\ell$ K ($\ell$, (Name, Addr, CC)). The ciphertext will have the desired format. Note that ciphertexts contain all the information required to reproduce the appropriate $\ell$ for decryption.

Embodiments of format-preserving Feistel cab be analyzed in terms of previously proposed attacks and novel attacks. Patarin's attack on Feistel networks is the only previous attack known to the inventors that applies to Feistel networks with rounds greater than 6. Recall, seven is the preferred minimum number of rounds. This attack attempts to distinguish between a Feistel network and a random permutation by making many queries. The attacker then computes all possible round functions, and checks if the queries and their responses are consistent with any one of the functions, outputting 1 if so. This attack requires an intractable 12 amount of computation, even for small sets. Consider attacking format-preserving Feistel using r rounds on domain Zn for n=ab. Then the number of possible instances of format-preserving Feistel is C=(ab)⌊r/2⌋·(ba)r−⌊r/2⌋. For simplicity (it won't affect the implications significantly) assume a=b, in which case C=ara. The probability that a random function from Zn to Zn (ignore permutivity constraints for simplicity) matches at least one of these functions for any set of q distinct domain points is at most C/nq. To achieve advantage one, then, the adversary needs to choose q so that C/nq=1. Rearranging we have that ara=nq=a2q and this implies that q=ra/2. Say a=b=10, which corresponds to using format-preserving Feistel to encrypt 2-digit numbers, and r=7. Then q=70/2=35, which is pretty small. Fortunately, the running time in this case is about qC=35·1070≈2237, making the attack practically intractable.

Highly unbalanced Feistel networks are susceptible to highly efficient attacks that succeed with exponentially vanishing probability as the number of rounds increases. Still, for small, fixed round number, the attacks could be dangerous. Assume a PRP adversary, A, against format-preserving Feistel for some $\ell$ such that split($\ell$) outputs a, b. Assume without loss of generality that a≤b. Let T $\in$ TwSp. Denote r($\ell$) by r and assume r is even (the attack easily extends to the case that r is odd). Then adversary A works as described below adversary AO(●,●,●):
L0
$←

Za; L'
0←L0; R0
$←
Zb; R'0
$←
Zb\{R0}
Y←O(T, $\ell$, (L0+a·R0)); Y'←O(T, $\ell$, (L'0+a·R'0))
D←Y mod b; D'+Y' mod b
If D−R0≡D'−R'0 (mod b) then Ret 1 Else Ret 0

First, analyze Pr[ARand ⇒ 1]. Adversary A outputs 1 exactly when D−R0+R'0≡D' (mod b). Thus Pr[ARand ⇒ 1]=1
a·1
b−1+a−1
a·1

Then, analyze Pr[AReal⇒ 1]. Let d=r/2. This is the number of times a value Ri is assigned in E for i>0 and even. Let $Z_1, \ldots, Z_r$ be the outputs of the round function F for rounds 1 to r (respectively) when evaluating ET,$\ell$ K (L0,R0) in response to A's first query. Similarly let $Z'_1, \ldots, Z'_r$ be the outputs of the round function F for rounds 1 to r (respectively) when evaluating ET,$\ell$ K(L'0,R'0) in response to A's second query.

Consider the situation in which Zi=Z'i for all i>0 and i even. This occurs with probability at least a-d. This is true because the inputs to each of the relevant d round function applications will collide with probability 1/a. Then, in this case it holds with probability one that D−R0≡D'−R'0 (mod b) since:
D≡Rr≡R0+X;
i≤r, i even
Zi (mod b) and D'≡R═r≡R'0+X
i≤r, i even
Z'
i (mod b).

Therefore Pr[AReal ⇒ 1]≥a-d. Combining this with the upper bound on Pr[ARand⇒ 1] given above yields
Advprp
format-preserving Feistel(A)≥
1
ad−
1
a(b−1)−
a−1
ab.

For certain values of a, b, r this is large. Say r=7 and N=2p for some relatively large prime p. Then a=2, b=p and A's advantage is ⅓−1/(2p−2)−½p.

The above attack can be adapted to mount message recovery attacks. The distinguishing attack establishes a relationship D−R0≡D'−R'0 (mod b) for distinct messages with high probability. If R0 is unknown, one can recover it if D, D', and R'0 are known. This requires a single known-plaintext and its associated ciphertext, which will have the desired collisions with the unknown plaintext with probability a-d. From the known plaintext, ciphertext pair one can recover the unknown plaintext portion R0. Then L0 can be guessed (with probability of success 1/a). The attack succeeds in recovering the full plaintext with probability at least a-d-1.

Figure 9:
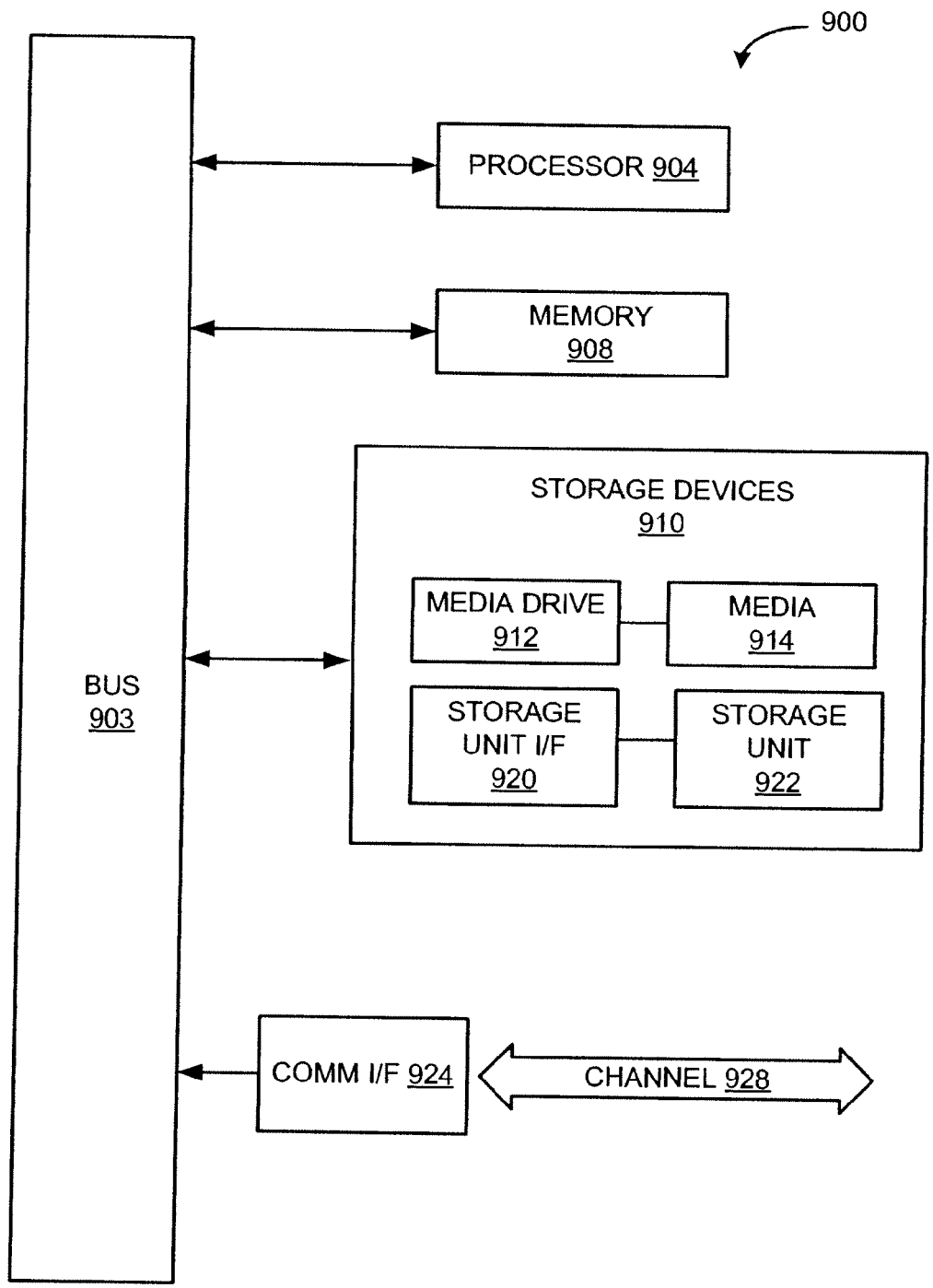
FIG. 9 is a diagram illustrating an example computing system with which software components may be executed.

As used herein, the articles "a" or "an" when referring to an item are not limited to requiring one and only one of the referenced item, and the various embodiments can include additional of the referenced items (or an alternative item) unless the context clearly dictates otherwise. As used herein, the terms "module" and "control logic" are used to describe a given unit of functionality that can be performed in accordance with one or more embodiments of the present invention. As used herein, a module or control logic can be implemented utilizing any form of hardware, circuitry, processing systems, software (including firmware), or a combination thereof. In implementation, the various control logic blocks or modules described herein can be implemented as discrete components or the functions and features described can be shared in part or in total among one or more modules and control logic items. Likewise, although a given item may be described as a module, that item may itself contain various modules to perform desired functionality. As would be apparent to one of ordinary skill in the art after reading this description, the various features and functionality described herein may be implemented in any given application can be implemented in one or more separate or shared modules or logic in various combinations and permutations.

Where features of the invention are implemented in whole or in part using software, in one embodiment, these elements can be implemented using a computing system capable of carrying out the functionality described with respect thereto. One such example computing system is shown in FIG. 9. Various embodiments are described in terms of this example computing system 900. After reading this description, it will become apparent to a person skilled in the relevant art how to implement the invention using other computing systems or architectures.

Referring now to FIG. 9, computing system 900 may represent, for example, desktop, laptop and notebook computers; hand-held computing devices (PDA's, cell phones, palmtops, etc.); mainframes, supercomputers, or servers; or any other type of special or general purpose computing devices as may be desirable or appropriate for a given application or environment. Computing system 900 can include one or more processors, such as a processor 904. Processor 904 can be implemented using a general or special purpose processing engine such as, for example, a microprocessor, controller or other control logic. Processor 904 may be connected to computing system 900 by a bus or other similar architecture.

Computing system 900 can also include a main memory 908, preferably random access memory (RAM) or other dynamic memory, for storing information and instructions to be executed by processor 904. Main memory 908 also may be used for storing temporary variables or other intermediate information during execution of instructions to be executed by processor 904. Computing system 900 can likewise includes a read only memory ("ROM") or other static storage device coupled to bus 902 for storing static information and instructions for processor 904.

The computing system 900 can also include information storage mechanism 910, which can include, for example, a media drive 912 and a removable storage interface 920. The media drive 912 can include a drive or other mechanism to support fixed or removable storage media. For example, a hard disk drive a floppy disk drive, a magnetic tape drive, an optical disk drive, a CD or DVD drive (R or RW), or other removable or fixed media drive. Storage media 918, can include, for example, a hard disk, a floppy disk, magnetic tape, optical disk, a CD or DVD, or other fixed or removable medium 914 that is read by and written to by media drive 912. As these examples illustrate, the storage media 914 can include a computer usable storage medium having stored therein particular computer software or data.

In alternative embodiments, information storage mechanism 910 may include other similar instrumentalities for allowing computer programs or other instructions or data to be loaded into computing system 900. Such instrumentalities can include, for example, a removable storage unit 922 and an interface 920. Examples of such can include a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical or other signals capable of being received by communications interface 924. These signals are provided to communications interface 924 via a channel 928. This channel 928 can carry signals and can be implemented using a wireless medium, wire or cable, fiber optics, or other communications medium. Some examples of a channel can include a phone line, a cellular phone link, an RF link, a network interface, a local or wide area network, and other communications channels.

In this document, the terms "computer program medium" and "computer usable medium" are used to generally refer to storage media such as, for example, memory 908, storage device 914, and a hard disk installed in hard disk drive 912. These and other various forms of computer usable media may be involved in carrying one or more sequences of one or more instructions to processor 904 for execution. Such instructions, generally referred to as "computer program code" (which may be grouped in the form of computer programs or other groupings), when executed, enable the computing system 900 to perform features or functions of the present invention as discussed herein.

In an embodiment where the elements are implemented using software, the software may be stored in a computer program medium and loaded into computing system 900 using removable storage drive 914, hard drive 912 or communications interface 924. The computer program logic (in this example, software instructions or computer program code), when executed by the processor 904, causes the processor 904 to perform the functions of the invention as described herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the terms "module" and "appliance" or the depiction of a box in a diagram does not imply that the components or functionality described or claimed as part of that item are all configured in a common package. Indeed, any or all of the various components of an item, whether control logic or other components, can be combined in a single package or separately maintained and can further be distributed across multiple locations. Likewise, multiple items can be combined into single packages or locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for deterministically encrypting a plaintext symbol set having a variable block size, the method comprising the steps of:
   dividing the plaintext symbol set into first and second portions;
   using a tweak to modify at least a portion of the plaintext symbol set to arrive at a data string;
   applying a first encryption key to encrypt the data string and generate a second encryption key based upon the data string encrypted by the first encryption key;
   computing a determined number of encryption rounds using the second encryption key to create an enciphered symbol set, wherein the encryption rounds comprise successive encryption and modulo combination of alternating portions of the symbol set utilizing a symbol set-associated modulo base by applying a tweakable, variable input length block cipher using the tweak, the tweak being based at least in part upon account information associated with a token; and providing the enciphered symbol set, the form of the enciphered symbol set corresponding to the plaintext symbol set in accordance with the symbol set-associated modulo base.

2. The method of claim 1, wherein computing a determined number of encryption rounds using the second encryption key comprises:

in a first encryption round encrypting the first portion of the symbol set using the second key and combining the encrypted first portion with the second portion of the symbol set using a modulo operation utilizing the symbol set-associated modulo base;

in a second encryption round, encrypting the second portion of the symbol set using the second key and combining the encrypted second portion with the output of the first round using a modulo operation utilizing the symbol set-associated modulo base; and in a subsequent encryption round, encrypting the output of the previous round set using the second key and combining the encrypted output of the previous round with the output of a round prior to the previous round using a modulo operation utilizing the symbol set-associated modulo base; and providing the enciphered symbol set, the form of the enciphered symbol set corresponding to the plaintext symbol set in accordance with the symbol set-associated modulo base.

3. The method of claim 1, wherein the step of applying the first key comprises:

defining first and second parameters based on the tweak; and encrypting a combination of the first and second parameters using the first key to generate the second key.

4. The method of claim 3, wherein encrypting comprises encrypting a first parameter with the first key to obtain an encrypted first parameter, combining the encrypted first parameter with the second parameter and encrypting the combination of the encrypted first parameter and second parameter using the first encryption key.

5. The method of claim 3, wherein encrypting comprises concatenating the first and second parameters and encrypting them with the first key.

6. The method of claim 1, wherein the step of applying the first key comprises creating a first parameter using the tweak, and encrypting the first parameter with the first key using an AES encryption cipher.

7. The method of claim 1, wherein the plaintext symbol set comprises token information.

8. The method of claim 1, wherein the plaintext symbol set comprises bankcard track data in a standard bankcard track data format, and wherein the enciphered symbol set is provided in the same format as the plaintext bankcard track data.

9. The method of claim 1, wherein the plaintext symbol set comprises bankcard track data comprised of symbols selected from the group consisting of decimal digits zero through nine, the modulo combination comprises modulo 10 addition or subtraction and the enciphered symbol set is comprised of symbols selected from the group consisting of decimal digits zero through nine.

10. The method of claim 1, wherein the modulo combination comprises modulo 62 addition or subtraction to encipher a plaintext symbol set comprised of symbols selected from the group consisting of alphanumeric upper and lower case characters and decimal digits zero through nine and to output.

11. The method of claim 1, wherein the tweak is at least one of variable length and concatenated.

12. A computer program product for deterministically encrypting a plaintext symbol set having a variable block size the computer program product comprising a non-transitory computer-readable storage medium having computer-readable program code embodied in said medium, the computer-readable program code comprising instructions configured to cause the a processing device to perform the steps of:

dividing the plaintext symbol set into first and second portions;

using a tweak to modify at least a portion of the plaintext symbol set to arrive at a data string;

applying a first encryption key to encrypt the data string and generate a second encryption key based upon the data string encrypted by the first encryption key;

computing a determined number of encryption rounds using the second encryption key to create an enciphered symbol set, wherein the encryption rounds comprise successive encryption and modulo combination of alternating portions of the symbol set utilizing a symbol set-associated modulo base by applying a tweakable, variable input length block cipher using the tweak, the tweak being based at least in part upon account information associated with a token; and providing the enciphered symbol set, the form of the enciphered symbol set corresponding to the plaintext symbol set in accordance with the symbol set-associated modulo base.

13. The computer program product of claim 12, wherein computing a determined number of encryption rounds using the second encryption key comprises:

in a first encryption round encrypting the first portion of the symbol set using the second key and combining the encrypted first portion with the second portion of the symbol set using a modulo operation utilizing the symbol set-associated modulo base;

in a second encryption round, encrypting the second portion of the symbol set using the second key and combining the encrypted second portion with the output of the first round using a modulo operation utilizing the symbol set-associated modulo base; and in a subsequent encryption round, encrypting the output of the previous round set using the second key and combining the encrypted output of the previous round with the output of a round prior to the previous round using a modulo operation utilizing the symbol set-associated modulo base; and providing enciphered symbol set, the form of the enciphered symbol set corresponding to the plaintext symbol set in accordance with the symbol set-associated modulo base.

14. The computer program product of claim 12, wherein applying the first key comprises:

defining first and second parameters based on the tweak; and encrypting a combination of the first and second parameters using the first key to generate the second key.

15. The computer program product of claim 14, wherein encrypting comprises encrypting a first parameter with the first key to obtain an encrypted first parameter, combining the encrypted first parameter with the second parameter and encrypting the combination of the encrypted first parameter and second parameter using the first encryption key.

16. The computer program product of claim 14, wherein encrypting comprises concatenating the first and second parameters and encrypting them with the first key.

17. The computer program product of claim 12, wherein applying the first key comprises creating a first parameter using the tweak, and encrypting the first parameter with the first key using an AES encryption cipher.

18. The computer program product of claim 12, wherein the plaintext symbol set comprises token information.

19. The computer program product of claim 12, wherein the plaintext symbol set comprises bankcard track data in a standard bankcard track data format, and wherein the enciphered symbol set is provided in the same format as the plaintext bankcard track data.

20. The computer program product of claim 12, wherein the plaintext symbol set comprises bankcard track data comprised of symbols selected from the group consisting of decimal digits zero through nine, the modulo combination comprises modulo 10 addition or subtraction and the enciphered symbol set is comprised of symbols selected from the group consisting of decimal digits zero through nine.

21. The computer program product of claim 12, wherein the modulo combination comprises modulo 62 addition or subtraction to encipher a plaintext symbol set comprised of symbols selected from the group consisting of alphanumeric upper and lower case characters and decimal digits zero through nine and to output.

22. The computer program product of claim 12, wherein the tweak is at least one of variable length and concatenated.

23. A magnetic stripe reader, comprising:
a magnetic read head proximate a card slot and configured to sense data magnetically encoded on the magnetic stripe of a bankcard and convert the data into an electronic signal;
a signal detector configured to receive the electronic signal from the read head and to convert the electronic signal into a symbol set representing track data for the magnetic stripe reader; and
an encryption module coupled to the signal detector and configured to deterministically encrypt the plaintext symbol set, wherein the encryption method comprises the steps of:
dividing the plaintext symbol set into first and second portions;
using a tweak to modify at least a portion of the plaintext symbol set to arrive at a data string;
applying a first encryption key to encrypt the data string and generate a second encryption key based upon the data string encrypted by the first encryption key;
computing a determined number of encryption rounds using the second encryption key to create an enciphered symbol set, wherein the encryption rounds comprise successive encryption and modulo combination of alternating portions of the symbol set utilizing a symbol set-associated modulo base by applying a tweakable, variable input length block cipher using the tweak, the tweak being based at least in part upon account information associated with a token; and
providing the enciphered symbol set, the form of the enciphered symbol set corresponding to the plaintext symbol set in accordance with the symbol set-associated modulo base.

* * * * *